United States Patent
Yamaji et al.

(10) Patent No.: US 8,842,256 B2
(45) Date of Patent: Sep. 23, 2014

(54) AWNING-MEMBER MOLDED ARTICLE AND AWNING

(75) Inventors: Katsuhiko Yamaji, Kyoto (JP); Ryoji Asano, Kyoto (JP); Mikio Kaneko, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/378,626

(22) PCT Filed: Jun. 16, 2010

(86) PCT No.: PCT/JP2010/060161
§ 371 (c)(1),
(2), (4) Date: Feb. 28, 2012

(87) PCT Pub. No.: WO2010/147128
PCT Pub. Date: Dec. 23, 2010

(65) Prior Publication Data
US 2012/0137616 A1   Jun. 7, 2012

(30) Foreign Application Priority Data

Jun. 18, 2009 (JP) ................ 2009-145179
Aug. 5, 2009 (JP) ................ 2009-182211
Dec. 18, 2009 (JP) ................ 2009-287154
Apr. 6, 2010 (JP) ................ 2010-087701

(51) Int. Cl.
*E04F 10/08* (2006.01)
*B29C 33/44* (2006.01)
*B29L 31/10* (2006.01)
*B29C 45/33* (2006.01)
*B29C 45/00* (2006.01)
*B29L 31/00* (2006.01)

(52) U.S. Cl.
CPC ............ *E04F 10/08* (2013.01); *B29L 2031/10* (2013.01); *B29C 45/33* (2013.01); *B29C 33/44* (2013.01); *B29C 45/006* (2013.01); *B29L 2031/772* (2013.01)

USPC .......................................... 352/75

(58) Field of Classification Search
USPC .............. 52/75–78, 578, 715, 7–4, 708, 704; 446/12, 121, 124, 125, 127, 108–110, 446/115, 476, 478
See application file for complete search history.

(56) References Cited

U.S. PATENT DOCUMENTS 3,768,216 A * 10/1973 Shirota et al. ................... 52/73
4,026,087 A *  5/1977 White ........................... 52/608

(Continued)

FOREIGN PATENT DOCUMENTS

JP     5-202591 A    8/1993
JP     2008-196254 A    8/2008

OTHER PUBLICATIONS

International Search Report for the Application No. PCT/JP2010/060161 mailed Aug. 3, 2010.

*Primary Examiner* — William Gilbert
*Assistant Examiner* — Kyle Walraed-Sullivan
(74) *Attorney, Agent, or Firm* — Cheng Law Group, PLLC

(57) ABSTRACT

Provided is an easily fabricated awning-member molded article having excellent strength, and an awning formed from a plurality of such awning-member molded articles. When an awning-member molded article is viewed from its bottom surface, a small-triangular plate portion bent toward a bottom surface of a second dihedron and a small-triangular plate portion bent toward a bottom surface of a third dihedron have a predetermined thickness at their portions abutted against each other, so that the second dihedron and the third dihedron in each basic element are coupled to each other. Further, a middle-triangular plate portion bent toward the bottom surface of the second basic element and a middle-triangular plate portion bent toward the bottom surface of the third basic element are provided with a predetermined thickness at their portions abutted against each other, so that the second basic element and the third basic element are coupled to each other.

24 Claims, 15 Drawing Sheets

(56) References Cited

U.S. PATENT DOCUMENTS

| | | | |
|---|---|---|---|
| 4,685,257 A * | 8/1987 | Richter | 52/73 |
| 5,575,701 A * | 11/1996 | Hantman | 446/104 |
| 5,895,304 A * | 4/1999 | Dixon | 446/70 |
| 6,186,855 B1 * | 2/2001 | Bauer et al. | 446/104 |

* cited by examiner

AWNING-MEMBER MOLDED ARTICLE AND AWNING

TECHNICAL FIELD

The present invention relates to awning-member molded articles and awnings which have light interception means and ventilation means for being capable of efficiently suppressing temperature rises and, more particularly, relates to injection-molded articles as members constituting fractal-structure awnings, and awnings formed from a plurality of such articles.

BACKGROUND ART

Patent Document 1 discloses an awning having a fractal structure which is constituted by four basic elements having a dihedral shape having a quadrilateral shape when viewed in a plane such that the basic elements are placed adjacent to each other leftwardly and rightwardly, forwardly and rearwardly, and upwardly and downwardly, wherein the respective basic elements are placed such that gaps as ventilation means are formed therebetween, but these gaps are nullified for light interception means when the basic elements are viewed in a maximum light-interception direction which is inclined by a predetermined angle.

Patent Document 1 further discloses, as a fabrication method thereof, forming partial cutouts in plastically-deformable plate members and folding the same to form fractal structure members (awning members).

PRIOR ART DOCUMENTS

Patent Documents

Patent Document 1: Japanese Unexamined Patent Publication No. 2008-196254

PROBLEMS TO BE SOLVED BY THE INVENTION

The awning member disclosed in Patent Document 1 had problems in that the fabrication thereof is burdensome, and it is hard to provide the awning member with sufficient strength.

It is an object of the present invention to provide an awning-member molded article which can be easily fabricated and have an excellent strength, and an awning formed from a plurality of the awning-member molded articles.

MEANS FOR SOLVING THE PROBLEMS

An awning-member molded article according to the present invention is an awning-member molded article having a fractal structure formed by injection molding, the awning-member molded article is constituted by four basic elements having a dihedral shape to form a quadrilateral shape when viewed in a plane, such that the basic elements are placed adjacent to each other leftwardly and rightwardly, forwardly and rearwardly, and upwardly and downwardly, the four basic elements including a first basic element at a reference position, a second basic element placed to either left or right of the first basic element, a third basic element placed at either front or rear of the first basic element, and a fourth basic element placed above the first to third basic elements, the respective basic elements being placed such that gaps are formed between the respective basic elements, the gaps being nullified when viewed in a maximum light-interception direction which is inclined by a predetermined angle, wherein the first basic element is coupled to the second basic element, the third basic element, and the fourth basic element at portions abutted against each other during injection molding, and the second basic element and the third basic element are coupled to each other at portions abutted against each other during the injection molding.

There have been known an awning-member having fractal structures, which are constituted by four basic elements having a dihedral shape to form a quadrilateral shape when viewed in a plane, such that the basic elements are placed adjacent to each other leftwardly and rightwardly, forwardly and rearwardly, and upwardly and downwardly, the four basic elements including a first basic element at a reference position, a second basic element placed to either left or right of the first basic element, a third basic element placed at either front or rear of the first basic element, and a fourth basic element placed above the first to third basic elements, wherein the respective basic elements are placed such that gaps as ventilation means are formed between the respective basic elements, but the gaps are nullified (substantially nullified) for light interception means when viewed in a maximum light-interception direction which is inclined by a predetermined angle.

Herein, the term "dihedral shape" means a shape including a dihedral main-body portion constituted by two triangular-shaped plate portions, and such a shape also includes a shape including a dihedral main-body portion provided with a protruding portion.

Such a dihedral shape including a dihedral main-body portion provided with a protruding portion can be rephrased as being constituted by a larger dihedron formed from two larger triangular portions coupled to each other in a reversed-V shape, and a smaller dihedron which is formed from two smaller triangular portions coupled to each other in a V shape and, is further coupled to the larger dihedron such that the smaller dihedron and the upper half part of the larger dihedron are symmetrical with each other. Herein, such a shape may be referred to as "tetrahedron" in some cases.

An awning member is to be installed at a building rooftop, for example, for intercepting sunlight, and the installation surface therefor is usually horizontal (but is not limited thereto). In installing the awning member, the respective lower sides of the first to third basic elements are placed on a horizontal surface, and the edge lines of the respective basic elements are inclined with respect to a vertical plane by a predetermined angle (30 to 40 degrees with respect to a horizontal plane). The awning member includes a symmetrical center surface which divides, into two symmetrical parts, the first basic element and the forth basic element, at the center thereof, and the second and third basic elements are placed symmetrically about the symmetrical center surface. The awning member is formed such that, when viewed in a direction orthogonal to the direction of the edge line, toward the symmetrical center surface, the gaps between the respective basic elements have sizes smaller than those of the gaps when viewed at its front surface and in a plane (these gaps are substantially nullified), wherein this direction orthogonal to the direction of the edge line toward the symmetrical center surface is the "maximum light-interception direction". The "maximum light-interception direction" can be also expressed as the direction which connects the portions of the first basic element and the fourth basic elements which are abutted against each other to the portions of the second basic element and the third basic element which are abutted against each other.

Regarding "a quadrilateral shape" when viewed in a plane, the first basic element at the reference position is made to form an angle of 90 degrees, at its portion forming a corner portion of the awning-member molded article, out of the corner portions of the first basic element. The second basic element and the third basic element are made to form angles which are slightly smaller than 90 degrees, at their portions forming corner portions of the awning-member molded article, out of the corner portions of the second basic element and the third basic element. The fourth basic element forms an angle larger than 90 degrees, at its portion forming a corner portion of the awning-member molded article, out of the corner portions of the fourth basic element.

The awning-member molded article is preferably shaped in a front view, such that, when the edge line is placed at the center, the awning-member molded article has an isosceles right triangular shape with a vertex angle of 90 degrees which is formed by a corner portion of the fourth basic element, with the lower surfaces of the first, second, and third basic elements forming the bottom side (the hypotenuse). In this case, the portions constituting the respective basic elements (the middle-triangular plate portions, the middle-triangular holes, and the respective dihedrons) also have isosceles right triangular shapes. Accordingly, in assembling such awning-member molded articles, it is possible to easily position the awning-member molded articles adjacent to each other, by using these isosceles right triangular shapes as references.

A conventional awning member has been fabricated by forming partial cutouts in plastically-deformable plate members and by folding the plate members to form triangular holes and folded portions therein, wherein each triangular hole is made to have a size slightly smaller than the sizes of the three triangular plate portions surrounding the triangular hole, so that the first basic element is coupled to the second basic element, the third basic element, and the fourth basic elements, at their portions abutted against with each other. However, with this fabricating method, it is impossible to attain coupling between the second basic element and the third basic element at their portions abutted against each other, without performing welcing afterward. This has induced the problem of poor strength.

In order to overcome this problem, according to the present invention, awning members are formed to be injection-molded articles made of a synthetic resin. Further, the second basic element and the third basic element are coupled to each other at their portions abutted against each other during the injection molding, thereby improving the strength, where it has been inevitably impossible to couple the second basic element and the third basic element to each other with the conventional fabricating method which forms partial cutouts in plastically-deformable plate members.

For example, each of the basic elements is constituted by four dihedrons having a quadrilateral shape when viewed in a plane, such that the dihedrons are placed adjacent to each other leftwardly and rightwardly, forwardly and rearwardly, and upwardly and downwardly, each basic element including a first dihedron at a reference position, a second dihedron placed to either right or left of the first dihedron, a third dihedron placed at either front or rear of the first dihedron, and a fourth dihedron placed above the first to third dihedrons, and the respective dihedrons are coupled to each other at portions abutted against each other during injection molding.

Such a basic element itself can be used as an awning-member molded article (a single-piece molded article different from an assembly constituted by a plurality of components) (in this case, the dihedrons form the basic elements in claim 1). Further, four of the basic elements can be placed adjacent to each other leftwardly and rightwardly, forwardly and rearwardly, and upwardly and downwardly (extended basic elements), to provide an awning-member molded article. In any cases, a plurality of (a larger number of) such awning-member molded articles can be continuously installed, in order to form an awning capable of covering a desired range.

Such an awning is an awning having a fractal structure which is formed from basic elements which are formed from dihedrons having a quadrilateral shape when viewed in a plane, as minimum units, and also, are constituted by four dihedrons, wherein the four dihedrons includes a first dihedron at a reference position, a second dihedron which is adjacent to the first dihedron such that they share a single vertex with each other, and their respective single sides exist on the same straight line, a third dihedron which is adjacent to the first dihedron such that this third dihedron shares another vertex of the first dihedron therewith and, also, exists on the same straight line as that of another side of the first dihedron, and a fourth dihedron which is adjacent, at its respective single sides, to the second and third dihedrons such that they share respective single vertexes with each other and, also, their respective single sides exist on the same straight lines and, further, which is adjacent to the first dihedron such that they share a single vertex with each other and their diagonal lines exist on the same straight line, and wherein the awning is constituted by a first basic element at a reference position, a second basic element which is adjacent to the first basic element such that they share a single vertex with each other, and their respective single sides exist on the same straight line, a third basic element which is adjacent to the first basic element such that this third basic element shares another vertex of the first basic element therewith and, also, exists on the same straight line as that of another side of the first basic element, and a fourth basic element which is adjacent, at its respective sides, to the second and third basic elements such that they share respective single vertexes with each other, and their respective single sides exist on the same straight lines and, further, which is adjacent to the first basic element such that they share a single vertex with each other, and their diagonal lines exist on the same straight line, wherein the respective basic elements are placed such that gaps are formed between the respective basic elements, but these gaps are nullified when viewed in a maximum light-interception direction which is inclined by a predetermined angle.

In injection molding therefor, the maximize light-interception direction is made coincident with an axial direction of the injection molding apparatus, in focusing attention to the fact that the respective basic elements are placed such that the gaps are nullified when viewed in the maximum light-interception direction which is inclined by a predetermined angle. Further, when these basic elements having such a dihedral shape are viewed in the direction of the edge line, their contour shapes with the same cross-sectional area are extended in this direction, thereby forming hollow shapes. Thus, focusing attention to this fact, by utilizing the hollow shapes, slide cores are inserted therein. This enables providing an awning-member molded article by performing injection molding only once. As the slide cores, for example, it is possible to employ a pair of slide cores which are adapted to approach and separate to and from each other, along the direction of the edge line, and it is possible to employ, as required, a plurality of pairs of slide cores which are adapted to approach and separate to and from each other, along the direction of the edge line.

The injection molding apparatus is adapted to form cavities using a first molding die which has a convex portion that conforms to a gap, the first molding die being brought into contact with the basic elements at a peak side, a second molding die which has a corrugated concave-and-convex portion, the second molding die being brought into contact with the basic elements at a valley side, and a slide core adapted to move in a direction of an edge line of the basic elements, and any one of the first and second molding dies is a fixed molding die, and the other one thereof is a movable molding die, and the molding dies are placed opposite to each other, such that the maximum light-interception direction of the awning-member molded article is coincident with an axial direction.

The awning-member molded article according to the present invention is provided with through holes, at its four corner portions which form a quadrilateral shape when viewed in a plane. Thus, awning-member molded articles adjacent to each other can be coupled to each other, through a joint having a protrusion to be fitted in a through hole in one of the awning-member molded articles and a protrusion to be fitted in a through hole in the other awning-member molded article. It is preferable that the through holes are formed at the same time as the injection molding, and that the joints are formed to be injection-molded articles made of a synthetic resin. Assembling of the awning using the joints is performed at a location where the awning should be installed, such as on a building roof top. Awning-member molded articles are placed adjacent to each other, and these awning-member molded articles adjacent to each other are coupled to each other through the joints. By repeating these operations, it is possible to efficiently assemble an awning.

Formation of awnings is not limited to those using joints, and instead, it is also possible to employ reinforcing members and wires for forming an awning.

For example, as an awning, a predetermined number of awning-member molded articles are placed such that their edge lines are continuous to each other to form a single unit, and this unit is supported by a reinforcing member extending in the direction of the edge line.

As the reinforcing members, it is possible to employ metal wires, metal lines, ropes made of natural fibers or synthetic fibers, and the like. The reinforcing members can be made to have flexibility and, thus, can be easily bent and, also, the reinforcing members can be made to have no flexibility like steel members. The reinforcing members can be secured to the respective awning-member molded articles, by using an adhesive agent, for example, or by additionally providing protrusions on the respective awning-member molded articles, further forming, in these protrusions, holes or slits for supporting the reinforcing members and, further, swaging these protrusions for securing these reinforcing members thereto. Also, when the reinforcing members have flexibility, it is possible to successively insert the reinforcing members into the through holes in the awning-member molded articles, using the through holes provided in the respective awning-member molded articles. When the reinforcing members have no flexibility, it is possible to insert wires into the through holes provided in the respective awning-member molded articles and to couple the reinforcing members and the awning-member molded articles to each other, through these wires.

A reinforcing member is made to have such a length that its opposite end portions are protruded from the awning-member molded articles at the opposite ends, and the reinforcing member is secured at its respective end portions to a pair of supporting members placed opposite to each other, so that a single unit is secured to the supporting members. Further, a plurality of units are placed to be arranged with a pitch corresponding to the size of the awning-member molded articles (the length thereof in the direction orthogonal to the direction of the edge line), thereby providing an awning having a quadrilateral shape when viewed in a plane, wherein the quadrilateral shape has a single side with a length corresponding to the length of the awning-member molded article in the direction of the edge line which is multiplied by the number of awning-member molded articles used in a single unit and, further, the quadrilateral shape has another side with a length corresponding to the length of the awning-member molded article in the direction orthogonal to the direction of the edge line which is multiplied by the number of units. The supporting members can be formed to be a frame supported by supporting columns at its four corners, for example. The supporting members can either be installed horizontally or be installed such that they are inclined by a predetermined angle with respect to a horizontal direction.

The supporting members for supporting the reinforcing members can be set according to the purpose in terms of the elevation angle and the orientation (north, south, east, and west) of the awning. For example, when it is desired to intercept sunlight during daytime in summer, the edge line can be oriented in a southward direction, and the elevation angle can be set according to the sun altitude. When it is desired to intercept afternoon sunlight, the edge line can be oriented in the westward direction, and the elevation angle can be set smaller according to the afternoon sunlight.

In general, it is preferable to orient the edge line of the awning in the southward direction and, also, to install the awning substantially horizontally, for intercepting almost all sunlight during summer while passing through almost all sunlight during winter.

Due to the use of reinforcing members, it is possible to facilitate the assembling thereof, also, it is possible to improve the strength thereof and, further, it is possible to adapt the awning to the time and the direction at and in which solar radiation is desired to be intercepted.

In installing the awning, by focusing on the fact that each basic element includes a vertex which is shared with a basic element adjacent thereto and a vertex which is not shared with an adjacent basic element, assuming that the vertexes which the first basic element share with the second, third, and fourth basic elements are B, C, and G, respectively, and the other vertex of the first basic element is A and, when the triangular shape ABC having the two sides AB and AC as the bottom sides is installed substantially horizontally, a point D is determined such that this point D and the point A are symmetrical about the side BC in the horizontal direction, and the angle F formed by $\angle ADG$ is defined as a reference angle. Further, using the latitude $\theta$ of the place in which the awning should be installed, the reference angle F (degrees) can be set to $113-S-\theta \leq F \leq 113+T-\theta$, in cases of $\theta \geq 23$, and can be to $F=90\pm 10$ in cases of $\theta<23$, wherein S is an appropriate number within the range of 5 to 10, and T is an appropriate number within the range of 0 to 5 (a first aspect of installation of the awning).

$\theta$ can be either the north latitude or the south latitude.

"$113-\theta$" corresponds to the sun altitude at the time of the summer solstice.

In cases where S nearly equals to 5, "$113-S-\theta$" corresponds to the sun altitude at the time the air temperature is highest, during the summer. Accordingly, by setting F in such a way as to satisfy $108-\theta \leq F \leq 113-\theta$, it is possible to provide an optimum awning for a region at a latitude of $\theta$. "S" and "T" indicate a permissible range of the deviation from this condition. "S+T" is an index corresponding to the types of awnings required for covering regions all over the world. In cases of S=5, for regions at $\theta \geq 23$, there is a need for awnings of $(90-23)/5 \approx 14$ types. In cases of S=10 and T=5, for regions at θ≧23, there is a need for awnings of only (90−23)/15≈5 types, although there is induced a somewhat larger deviation from an optimum value for the sun altitude.

In order to install an awning, further, when a tetrahedron is viewed in a second horizontal direction orthogonal to a first horizontal direction, its shape is formed from a lower reversed-triangular portion abd which has a vertex a positioned on an installation surface and is placed at a lower side, and two upper triangular portions bfc and dce which are placed at an upper side to form a triangular-shaped opening portion bcd between themselves and the lower reversed-triangular portion abd, wherein the straight line af forming a single side of the larger triangular portion, and the straight line ef forming the edge line of the larger dihedron are caused to form an angle α (degrees) corresponding to a sun altitude during the winter season, and the straight line ac which equally divides the larger triangular portion into two parts, and the straight line ef which forms the edge line of the larger dihedron are caused to form an angle β (degrees) (β>α) corresponding to a sun altitude during the summer season (a second aspect of installation of an awning).

With the installation in the second aspect, the point a is positioned on the installation surface, the point c, the point e, and the point f form the edge line (at a maximum height), and the point b and the point d form a ½-height line. The straight line ef is parallel with the installation surface, and the straight line af and the straight line ef form an angle equal to the angle formed between the straight line af and the installation surface. Further, the straight line ac and the straight line ef forms an angle equal to the angle formed between the straight line ac and the installation surface.

The opening portions have the effect of facilitating ventilation, thereby realizing both the light interception characteristic and the improvement of ventilation. With this awning, when this awning is viewed in a certain direction, the value of the areas of the opening portions divided by the entire area is largely varied depending on this direction (the angle). It is preferable to intercept sunlight during the summer season, but it is not preferable to intercept sunlight during the winter season.

Therefore, in the second aspect of awning installation, the straight line af and the straight line ef (the installation surface) are caused to form an angle equal to the angle α (degrees) corresponding to a sun altitude during the winter season, and the straight line ac and the straight line ef (the installation surface) are caused to form an angle equal to the angle β (degrees) corresponding to a sun altitude during the summer season (β>α). This enables intercepting sunlight during the summer season, and also allows sunlight to easily pass therethrough during the winter season, which facilitates installing the awning at appropriate angles, in installing the awning in different regions all over the world.

In the aforementioned case, it is preferable to set α and β in such a way as to satisfy the followings; αmin<α<αmin+10, and βmax−10<β<βmax, wherein the following holds; αmin=90−(the latitude+23), and βmax=90−(the latitude−23) or βmax=90−(23−the latitude).

Here, "αmin" is the lowest sun altitude at the time of the winter solstice in the Northern Hemisphere, and "αmin<α<αmin+10" indicates that it is preferable that α is larger than αmin and falls within a range equal to or less than αmin+10, wherein "αmin+10" is the sun altitude at the time of 1 to 2 months after the winter solstice and, at this time, the air temperature is actually lowest.

"βmax" is the highest sun altitude at the time of the summer solstice, in the Northern Hemisphere. In regions at latitudes higher than 23 degrees, "βmax" can be determined in a different way from that for regions at latitudes lower than 23 degrees. In regions at latitudes higher than 23 degrees, the following holds; βmax=90−(the latitude−23). In regions at latitudes lower than 23 degrees, the following holds; βmax=90−(23−the latitude). "βmax−10<β<βmax" indicates that it is preferable that β is smaller than βmax and falls within a range equal to or more than βmax−10, wherein "βmax−10" is the sun altitude at the time of 1 to 2 months after the summer solstice and, at this time, the air temperature is actually highest.

Further, in the first and second aspects of awning installation, "23 degrees" corresponds to the inclination of the axis of the Earth. The inclination of the axis of the Earth is accurately 23.4 degrees, however, since 0.4 degrees hardly affects the effect thereof, it is defined as 23 degrees in the present specification.

According to the first and second aspects of awning installation, it is possible to overcome the problem of necessity or calculations based on the sun angles for respective installation areas, which enables installing the awning at appropriate angles, in installing the awning in different regions all over the world.

EFFECTS OF THE INVENTION

According to the present invention, an awning member formed from four basic elements is formed to be an integrated injection-molded article and, also, a first basic element is coupled, at the time of injection molding, to a second basic element, a third basic element, and a fourth basic element, at their portions abutted against each other and, furthermore, the second basic element and the third basic element are also coupled to each other at the time of the injection molding, which facilitates fabrication of the awning member and also improves the strength of the awning member.

Figure 1:
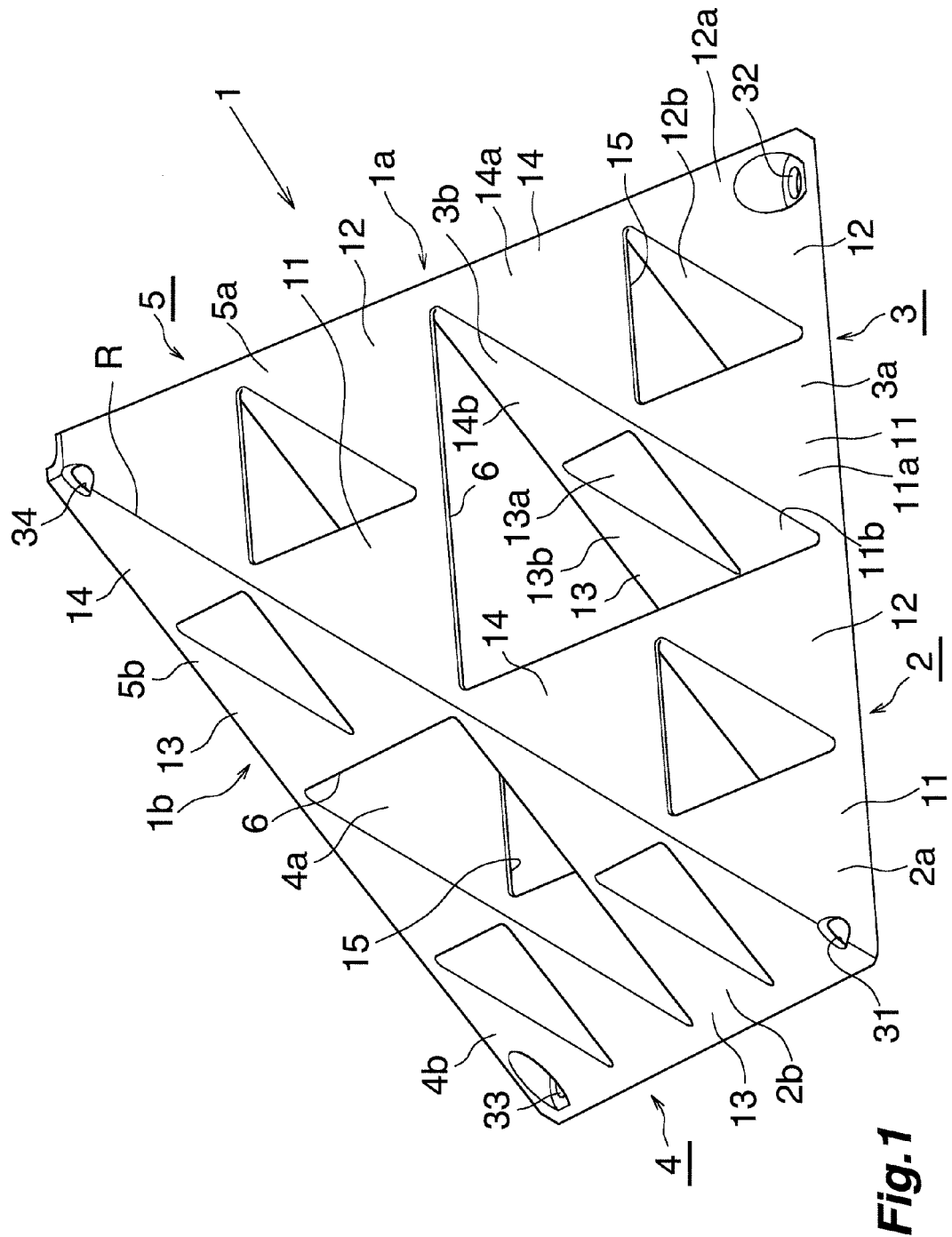
FIG. 1 is a perspective view illustrating a first embodiment of an awning-member molded article according to the present invention.

DESCRIPTION OF REFERENCE SIGNS (1) Awning-member molded article
(2) (3) (4) (5) Basic element
(2A) (2B) (2C) (2D) Basic element
(10) Larger dihedron
(11) (12) (13) (14) Dihedron
(20) Smaller dihedron
(20a) (20b) Smaller triangular portion
(31) (32) (33) (34) Through hole
(35) (36) (37) Joint
(50) Unit
(51) Reinforcing member
(61) (62) Larger triangular portion
(61a) (62a) Lower reversed-triangular portion
(61b) (62b) (61c) (62c) Upper triangular portion
(61d) (62d) Triangular-shaped opening portion

EMBODIMENTS FOR CARRYING OUT THE INVENTION

Hereinafter, embodiments of the present invention will be described, with reference to the drawings. In the following description, the terms "left", "right", "upper", and "lower" refer to left, right, upper, and lower sides defined with respect to FIG. 1, and the terms "front" and "rear" refer to directions orthogonal thereto (the term "front" refers to a side closer to the front side of the paper plane in FIG. 1).

An awning-member molded article (1) is shaped such that a single article has a shape formed by injection molding, which is illustrated in FIGS. 1 to 6. By employing a plurality of the awning-member molded articles, and by arranging the articles leftwardly and rightwardly, forwardly and rearwardly, and upwardly and downwardly, it is possible to provide an awning illustrated in FIG. 9 and FIG. 10 (only a portion thereof is illustrated). Such an awning has a fractal structure constituted by a plurality of awning-member molded articles (1), wherein each awning-member molded article (1) is formed to have a fractal structure constituted by four basic elements (2) (3) (4) (5), and each of the basic elements (2) (3) (4) (5) also has a fractal structure constituted by dihedrons (11) (12) (13) (14) formed from the same triangular shapes which are symmetrically integrated with each other, with these dihedrons being units.

Each basic element (2) (3) (4) (5) is constituted by four dihedrons (11) (12) (13) (14) having a quadrilateral shape when viewed in a plane, such that these dihedrons are placed adjacent to each other leftwardly and rightwardly, forwardly and rearwardly, and upwardly and downwardly. Further, each basic element (2) (3) (4) (5) is constituted by a first dihedron (11) at a reference position, a second dihedron (12) placed at the right of the first dihedron (11), a third dihedron (13) placed at the rear of the first dihedron (11), and a fourth dihedron (14) placed above the first to third dihedrons (11) (12) (13).

The awning-member molded article (1) is constituted by the four basic elements (2) (3) (4) (5) which are placed adjacent to each other leftwardly and rightwardly, forwardly and rearwardly, and upwardly and downwardly. Further, the awning-member molded article (1) is constituted by the first basic element (2) at a reference position, the second basic element (3) placed to the right of the first basic element (2), the third basic element (4) placed at the rear of the first basic element (2), and the fourth basic element (5) placed above the first to third basic elements (2) (3) (4).

Each basic element (2) (3) (4) (5) has a quadrilateral shape when viewed in a plane, and the awning-member molded article (1) also has a quadrilateral shape when viewed in a plane. Further, the respective edge lines in the first and fourth dihedrons (11) (14) included in the first and fourth basic elements (2) (5) are continuous with each other, and these edge lines form the edge line (R) in the awning-member molded article (1) having a dihedral shape in its entirety. The edge line (R) is inclined with respect to a horizontal plane by a desired angle (about 30 to 40 degrees).

Figure 7:
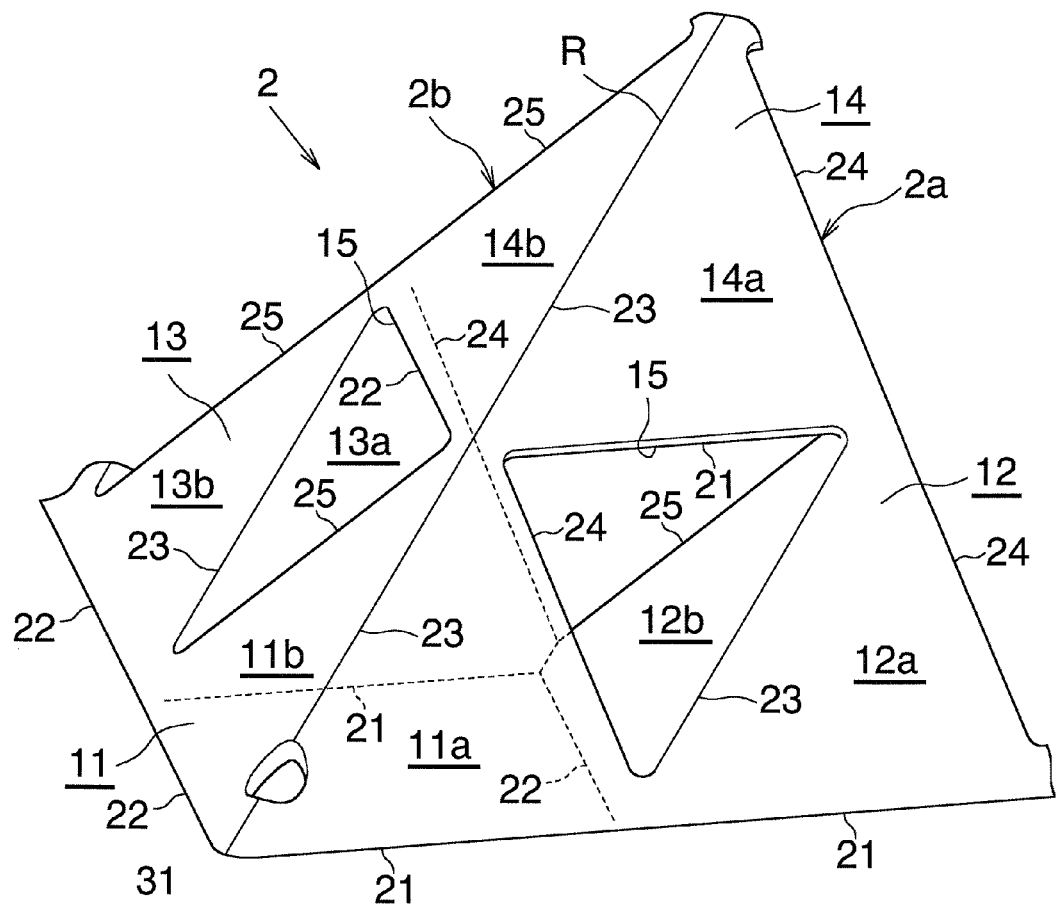
FIG. 7 is an enlarged perspective view of a basic element in the awning-member molded article according to the present invention.

As illustrated in an enlarged manner in FIG. 7, the four dihedrons (11) (12) (13) (14) constituting the basic element (2) (and similarly the other basic elements (3) (4) (5)) have the same shape, and each dihedron (11) (12) (13) (14) is constituted by a small-triangular plate portion (11a) (12a) (13a) (14a) forming a front surface thereof, and a small-triangular plate portion (11b) (12b) (13b) (14b) forming a side surface thereof. The first dihedron (11) is formed from lower sides (21) (22) in the leftward and rightward directions and in the forward and rearward directions which are positioned in a horizontal plane to form two sides of a square shape, a common side (23) extending obliquely upward from the intersection of the lower sides (21) (22) to form the edge line (R), and upper sides (24) (25) in the front and rear sides which connect the upper end portion of the common side (23) to end portions of the respective lower sides (21) (22). The second dihedron (12) is formed from a lower side (21) in the leftward and rightward directions which is a leftward-and-rightward extension of the leftward-and-rightward lower side (21) of the first dihedron (11), a lower side (22) in the forward and rearward directions which is parallel to the forward-and-rearward lower side (22) of the first dihedron (11), a common side (23) parallel to the common side (23) of the first dihedron (11), and upper sides (24) (25) in the front and rear sides which are parallel to the front and rear upper sides (24) (25), respectively, of the first dihedron (11). The third dihedron (13) is formed from a lower side (22) in the forward and rearward directions which is a forward-and-rearward extension of the forward-and-rearward lower side (22) of the first dihedron (11), a lower side (21) in the leftward and rightward directions which is parallel to the leftward-and-rightward lower side (21) of the first dihedron (11), a common side (23) parallel to the common side (23) of the first dihedron (11), and upper sides (24) (25) in the front and rear sides which are parallel to the front and rear upper sides (24) (25), respectively, of the first dihedron (11). The fourth dihedron (14) is formed from a common side (23) which is an obliquely-upward extension of the common side (23) of the first dihedron (11), an upper side (24) in the front side which is an obliquely-upward extension of the front-side upper side (24) of the second dihedron (12), an upper side (25) in the rear side which is an obliquely-upward extension of the rear-side upper side (25) of the third dihedron (13), a lower side (21) in the leftward and rightward directions which is parallel to the leftward-and-rightward lower side (21) of the first dihedron (11), and a lower side (22) in the forward and rearward directions which is parallel to the forward-and-rearward lower side (22) of the first dihedron (11).

Referring to FIG. 7, the small-triangular plate portions (11a) (12a) (14a) forming the front surfaces of the first, second, and fourth dihedrons (11) (12) (14) are in the same plane (the front surface) and, with respect to this front surface, the small-triangular plate portion (12b) forming the side surface of the second dihedron (12) is bent toward the bottom surface, so that a small-triangular hole (15) with a triangular shape is formed in the front surface of the basic element (2). Further, the small-triangular plate portions (11b) (13b) (14b) forming the side surfaces of the first, third, and fourth dihedrons (11) (13) (14) are in the same plane (the side surface) and, with respect to this side surface, the small-triangular plate portion (13a) forming the front surface of the third dihedron (13) is bent toward the bottom surface, so that a small-triangular hole (15) with a triangular shape is formed in the side surface of the basic element (2). Thus, the basic element (2) has a dihedral shape constituted by a dihedron main-body portion formed from two middle-triangular plate portions (2a) (2b) having the small-triangular holes (15) at their center portions which are coupled to each other with the edge line (R) interposed therebetween, and small-triangular plate portions (the protruding portions) (12b) (13a) which are bent toward the bottom surface with respect to the middle-triangular plate portions (2a) (2b).

Each of the small-triangular holes (15) is made to have a size slightly smaller than the sizes of the three triangular plate portions (11a) (12a) (14a) (11b) (13b) (14b) which surround the small-triangular hole (15), which secures a predetermined thickness between the triangular plate portions (11a) (12a) (14a) (11b) (13b) (14b) which are adjacent to each other, so that these triangular plate portions (11a) (12a) (14a) (11b) (13b) (14b) are coupled to each other at their portions abutted against each other. The basic elements (2) (3) (4) (5) which are adjacent to each other leftwardly and rightwardly, forwardly and rearwardly, and upwardly and downwardly are also coupled to each other, since there is secured a predetermined thickness at their portions abutted against each other.

In the awning-member molded article (1) constituted by the four basic elements (2) (3) (4) (5), the middle-triangular plate portions (2a) (3a) (5a) forming the front surfaces of the first, second, and fourth basic elements (2) (3) (5) are in the same plane (the front surface) and, with respect to this front surface, the middle-triangular plate portion (3b) forming the side surface of the second basic element (3) is bent toward the bottom surface, so that a middle-triangular hole (6) with a triangular shape is formed in the large-triangular portion (1a) at the front surface. Further, the middle-triangular plate portions (2b) (4b) (5b) forming the side surfaces of the first, third, and fourth basic elements (2) (4) (5), respectively, are in the same plane (the side surface) and, with respect to this side surface, the middle-triangular plate portion (4a) forming the front surface of the third basic element (4) is bent toward the bottom surface, so that a middle-triangular hole (6) with a triangular shape is formed in the large-triangular portion (1b) at the side surface. As a result, the awning-member molded article (1) has a dihedral shape constituted by a dihedron main-body portion formed from the two large-triangular plate portions (1a) (1b) having the middle-triangular holes (6) at their center portions which are coupled to each other with the edge line (R) interposed therebetween, and the middle-triangular plate portions (the protruding portions) (3b) (4a) which are bent toward the bottom surface with respect to the large-triangular plate portions (1a) (1b).

Figure 9:
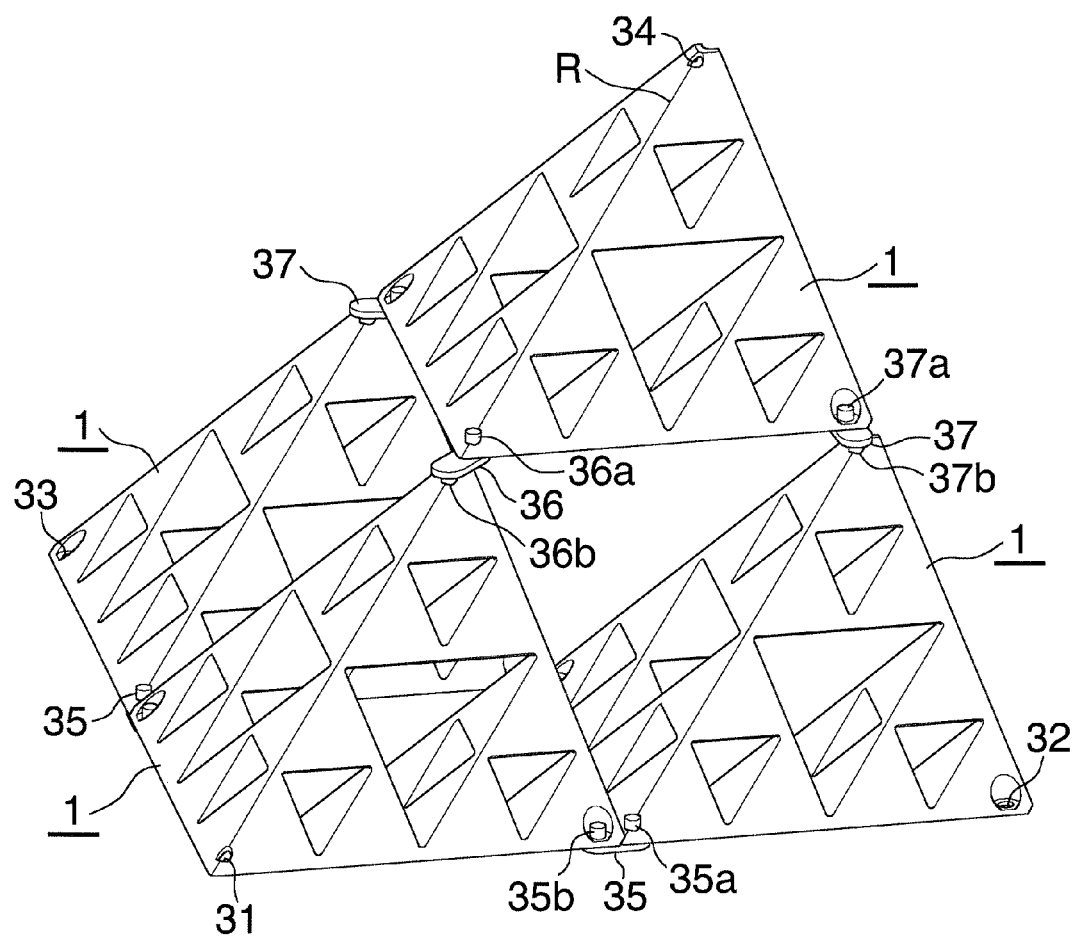
FIG. 9 is a perspective view illustrating a portion of the first embodiment of an awning which is assembled using a plurality of awning-member molded articles according to the present invention.

Accordingly, by regarding the awning-member molded article (1) as a basic element, and by using four of the awning-member molded articles (1) such that they are placed leftwardly and rightwardly, forwardly and rearwardly, and upwardly and downwardly, similarly to the basic elements (2) (3) (4) (5), it is possible to provide an assembly formed from the awning-member melded articles (1) illustrated in FIG. 9. Further, by properly increasing the number of awning-member molded articles (1) used therein, it is possible to provide an awning having a required size.

Figure 2:
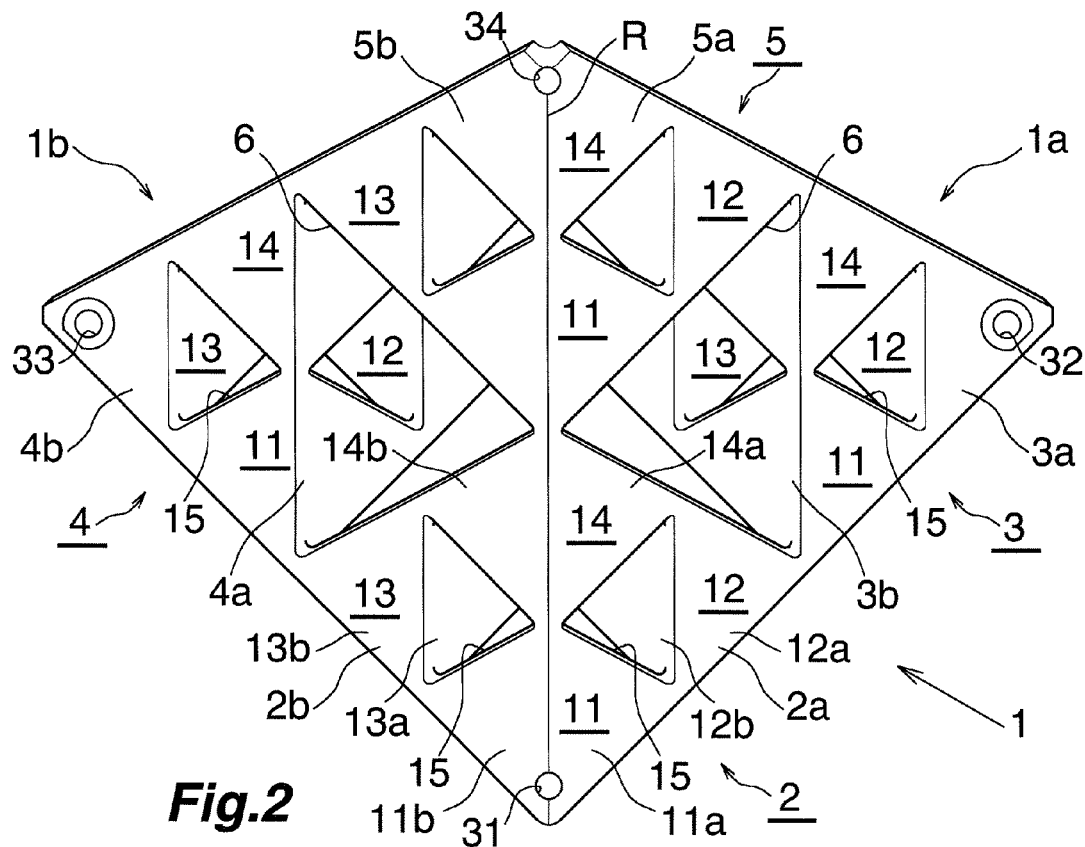
FIG. 2 is a plan view of the same.

Referring to a plan view illustrated in FIG. 2, the first basic element (2) at the reference position is made to form an angle of 90 degrees, at its portion forming a corner portion of the awning-member molded article (1) (the corner portion at the lower side in FIG. 2), out of the corner portions of the first basic element (2), and the edge line (R) equally divides the corner portion into two parts. The second basic element (3) and the third basic element (4) are made to form equal angles which are slightly smaller than 90 degrees, at their portions forming corner portions of the awning-member molded article (1) (the corner portions in the left and right sides in FIG. 2), out of the corner portions of the second basic element (3) and the third basic element (4). Accordingly, the fourth basic element (5) forms an angle larger than 90 degrees, at its portion forming a corner portion of the awning-member molded article (1) (the corner portion at an upper side in FIG. 2), out of the corner portions of the fourth basic element (5).

Figure 3:
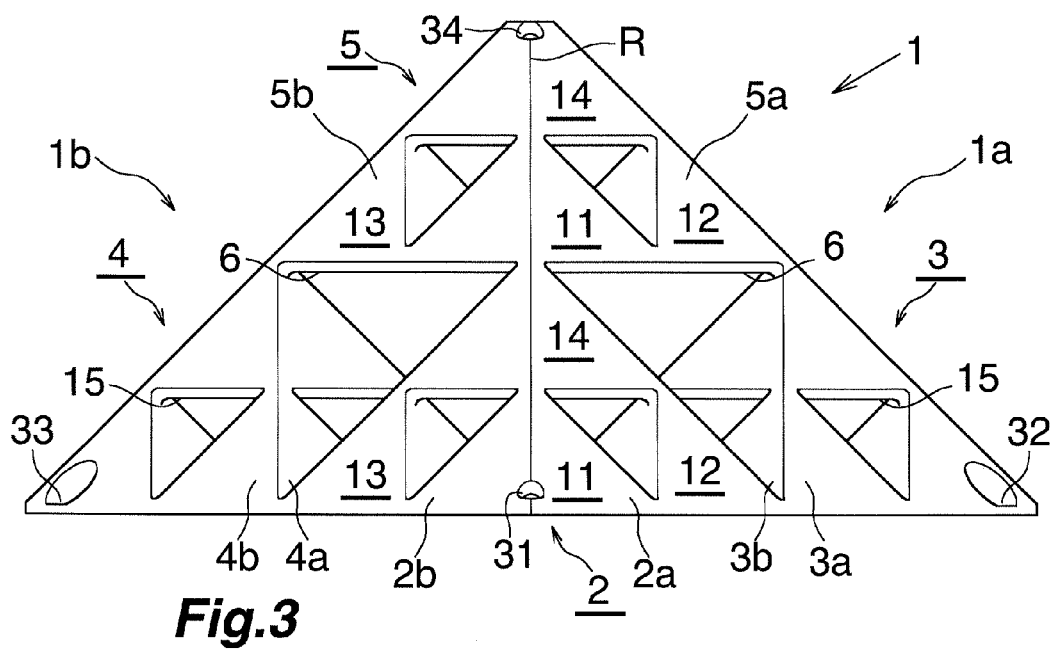
FIG. 3 is a front view of the awning-member molded article according to the present invention, wherein an edge line thereof is placed at the center.

Further, referring to a front view illustrated in FIG. 3 wherein the edge line (R) is placed at the center, the awning-member molded article (1) has an isosceles right triangular shape with a vertex angle of 90 degrees which is formed by a corner portion of the fourth basic element (4), with the lower surfaces of the first, second, and third basic elements (2) (3) (4) forming the bottom side (the hypotenuse). When viewed in this direction, the middle-triangular plate portions (2a) (2b) (3a) (3b) (4a) (4b) (5a) (5b), the middle-triangular holes (6), and the respective dihedrons (11) (12) (13) (14) in the respective basic elements (2) (3) (4) (5) also have isosceles right triangular shapes. Accordingly, in assembling such awning-member molded articles (1), it is possible to easily position the awning-member molded articles (1) adjacent to each other, by using these isosceles right triangular shapes as references. The middle-triangular plate portions (2a) (2b) (3a) (3b) (4a) (4b) (5a) (5b), the middle-triangular holes (6), and the respective dihedrons (11) (12) (13) (14) in the respective basic elements (2) (3) (4) (5) are made to have contour shapes determined such that they form respective isosceles right triangular shapes in the front view of FIG. 3 wherein the edge line (R) is placed at the center, so that their contour shapes are scalene obtuse triangular shapes.

Figure 4:
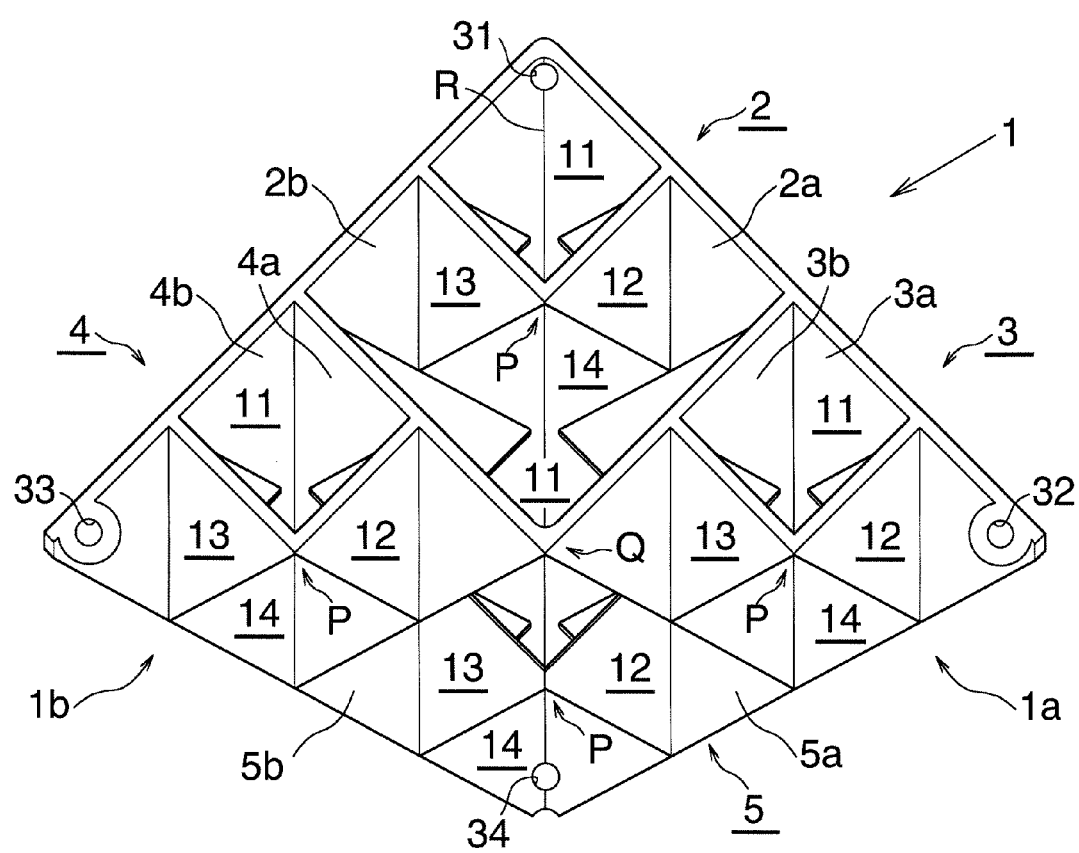
FIG. 4 is a bottom view of the same.

Referring to a bottom view illustrated in FIG. 4, in a fractal structure formed from conventional plate members, a small-triangular plate portion (12b) bent toward the bottom surface of the second dihedron (12) and a small-triangular plate portion (13a) bent toward the bottom surface of the third dihedron (13) form free ends, at their portions abutting against each other which are indicated by arrows P. Accordingly, such a fractal structure has had poor strength and, also, has made it hard to maintain its shape. However, with the awning-member molded article (1) according to the present invention, the small-triangular plate portion (12b) bent toward the bottom surface of the second dihedron (12) and the small-triangular plate portion (13a) bent toward the bottom surface of the third dihedron (13) have a predetermined thickness, at their portions abutted against each other, so that the second dihedron (12) and the third dihedron (13) in each of the basic elements (2) (3) (4) (5) are coupled to each other, which greatly improves the strengths of the respective basic elements (2) (3) (4) (5) in the awning-member molded article (1).

Further, in forming the awning-member molded article (1) from the respective basic elements (2) (3) (4) (5), the middle-triangular plate portion (3b) bent toward the bottom surface of the second basic element (3) and the middle-triangular plate portion (4a) bent toward the bottom surface of the third basic element (4) are provided with a predetermined thickness, at their portions abutted against each other, which are indicated by an arrow Q, so that the second basic element (3) and the third basic element (4) are coupled to each other, thereby further improving the strength of the awning-member molded article (1).

That is, with fractal structures formed from conventional plate members, the number of uncoupled abutting portions is increased and, thus, the strength is degraded, with increasing number of elements. On the contrary, the awning-member molded article (1) according to the present invention includes no uncoupled abutting portion, which prevents degradation of the strength thereof, even when the number of elements is increased.

Figure 5:
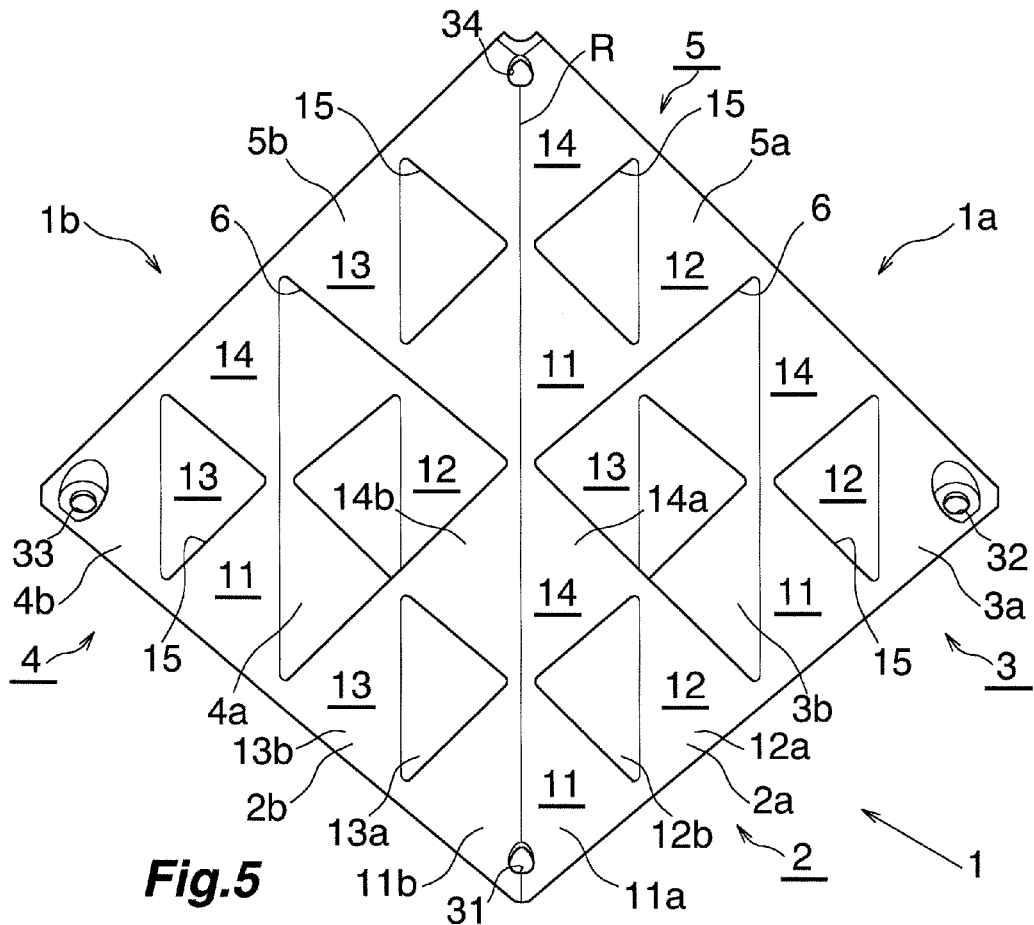
FIG. 5 is a view of the awning-member molded article according to the present invention, when viewed in a maximum light-interception direction.

The awning-member molded article (1) is provided with the triangular holes (6) (15) having different sizes as described above and, therefore, the awning-member molded article (1) is shaped to have gaps as ventilation means at a plurality of positions (there are portions which are not covered with the triangular plate portions (3b) (4a) (12b) (13a) behind the triangular holes (6) (15)), in any of FIGS. 1 to 4. Further, in cases where the awning-member molded article (1) is viewed obliquely from thereabove with the edge line (R) being in the front side (corresponding to a case when viewed in the direction from the sun), as illustrated in FIG. 5, the small-triangular holes (15) are closed by the small-triangular plate portions (12b) (13a) which are bent and, also, the middle-triangular holes (6) are closed by the middle-triangular plate portions (3b) (4a) which are bent, so that the gaps in the awning-member molded article (1) are substantially nullified for interception means, thereby enhancing the light intercepting characteristic. The respective triangular holes (6) (15) have effects of facilitating ventilation, thereby realizing both the light interception characteristic and the improvement of ventilation.

Figure 6:
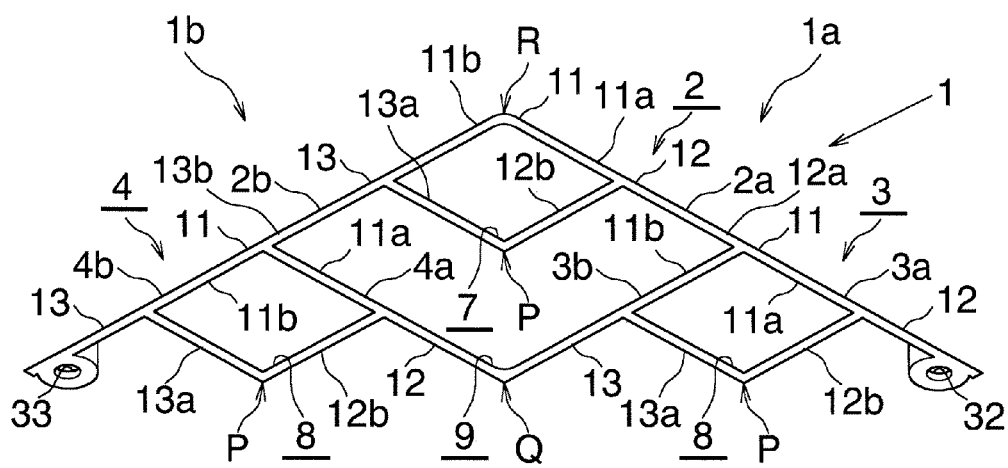
FIG. 6 is a view of the awning-member molded article according to the present invention, when viewed in a direction of the edge line thereof.

Further, when the awning-member molded article (1) is viewed from thereabove in the direction of the edge line, as illustrated in FIG. 6, the small-triangular plate portion (12b) bent toward the bottom surface of the second dihedron (12) and the small-triangular plate portion (13a) bent toward the bottom surface of the third dihedron (13) are coupled to each other, at the portion indicated by an arrow P, namely, at their portions abutted against each other. Accordingly, a hollow-shaped tubular portion (a first tubular portion) (7) having a rhombic-shaped cross-sectional area and extending in the direction of the edge line are formed by the respective small-triangular plate portions (11a) (11b) of the first dihedron (11) (and the respective small-triangular plate portions (14a) (14b) of the fourth dihedron (14) therebehind) in the first basic element (2) (and the fourth basic element (5) therebehind), and the respective small-triangular plate portions (12b) (13a) bent toward the bottom surfaces of the second and third dihedrons (12) (13) in the first basic element (2) (and the fourth basic element (5) therebehind). Similarly, in the second and third basic elements (3) (4), two hollow-shaped tubular portions (second tubular portions) (8) extending in the direction of the edge line and having a rhombic-shaped cross-sectional area and a length which is one half that of the first tubular portion (7) are formed by the respective small-triangular plate portions (11a) (11b) of the first dihedron (11) (and the respective small-triangular plate portions (14a) (14b) of the fourth dihedron (14) therebehind), and the respective small-triangular plate portions (12b) (13a) bent toward the bottom surfaces of the second and third dihedrons (12) (13).

Further, the middle-triangular plate portion (3b) bent toward the bottom surface of the second basic element (3) and the middle-triangular plate portion (4a) bent toward the bottom surface of the third basic element (4) are coupled to each other, at the portion indicated by an arrow Q, namely, at their portions abutted against each other. Accordingly, there is formed a hollow-shaped tubular portion (a third tubular portion) (9) having a V-shaped cross-sectional area and extending in the direction of the edge line, by the respective small-triangular plate portions (12a) (12b) (13a) (13b) of the second and third dihedrons (12) (13) in the first basic element (2) (and the fourth basic element (5) therebehind) and the middle-triangular plate portions (3b) (4a) bent toward the bottom surfaces of the second and third basic elements (3) (4). The peripheral walls of these tubular portions (7) (8) (9) are cut out at the portions corresponding to the gaps (the triangular holes (6) (15)).

Focusing on the shape illustrated in FIG. 6, it is possible to obtain the awning-member molded article (1) through injection molding, by inserting slide cores (43) (44) (45) having cross-sectional shapes corresponding to the cross-sectional shapes of the tubular portions (7) (8) (9) into the insides of the tubular portions (7) (8) (9) from their opposite sides in the direction of the edge line (from the front and rear sides with respect to the paper plane of FIG. 6) and, also, by sandwiching the awning-member molded article (1) by a pair of molding dies (41) (42) at its opposite sides in the upward and downward directions in FIG. 6.

Figure 8:
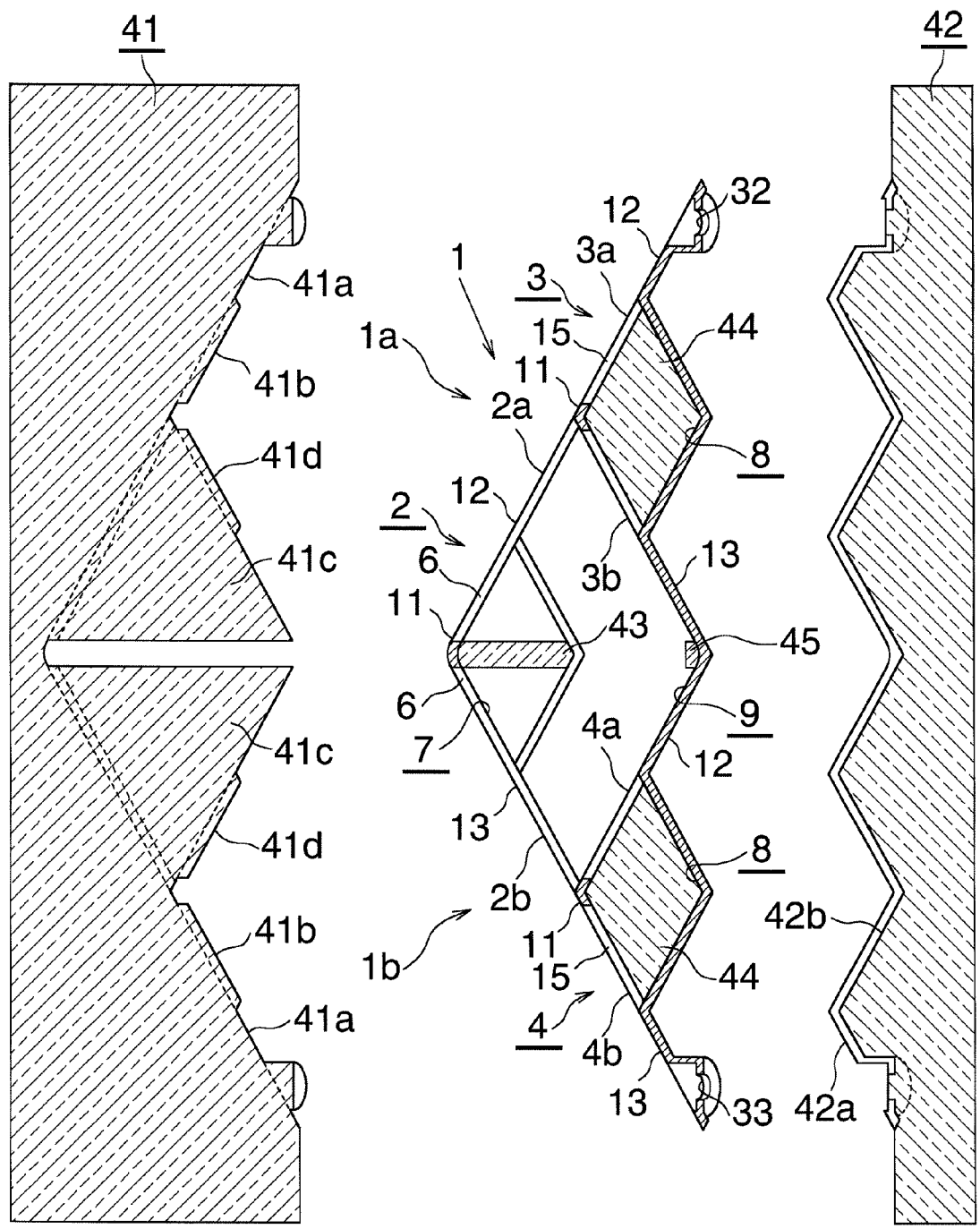
FIG. 8 is a longitudinal cross-sectional view illustrating an example of molding dies for fabricating the awning-member molded article according to the present invention.

That is, in order to obtain the awning-member molded article (1), as illustrated in FIG. 8, an injection molding apparatus is employed, wherein the injection molding apparatus includes a movable molding die (41) which includes a V-shaped concave surface (41a) and can be moved in leftward and rightward directions in the figure (in a direction orthogonal to the direction of the edge line) while being brought into contact with a peak side of the awning-member molded article (1), a fixed molding die (42) which has a corrugated concave-and-convex surface (42a) and is brought into contact with a valley side of the awning-member molded article (1), and a plurality of pairs of slide cores (43) (44) (45) which are adapted to approach and separate to and from each other in the direction of the edge line of the awning-member molded article (1).

The V-shaped concave surface (41a) in the movable molding die (41) is for forming the surfaces of the large-triangular portions (1a) (1b) in the awning-member molded article (1) and, on the concave surface (41a), there are provided first convex portions (41b) which fit into the small-triangular holes (15) in the front surface and the side surface of the large-triangular portions (1a) (1b), second convex portions (41c) which fit into the middle-triangular holes (6) in the front surface and the side surface of the large-triangular portions (1a) (1b) to form the surfaces of the middle-triangular plate portion (3b) bent toward the bottom surface of the second basic element (3) and the middle-triangular plate portion (4a) bent toward the bottom surface of the third basic element (4), and third convex portions (41d) which are continuous with the second convex portions (41c) and fit into the respective small-triangular holes (15) in the middle-triangular plate portion (3b) in the second basic element (3) and the middle-triangular plate portion (4a) in the third basic element (4).

As the slide cores (43) (44) (45), there are employed a moveable-molding-die side core (43) which is to be inserted into the first tubular portion (7) and is shaped to have a rhombic-shaped cross-sectional area and not to interface with the second convex portions (41c) at its center portion, fixed-molding-die side cores (44) which are to be inserted into the second tubular-shaped portions (8) and have a rhombic-shaped cross-sectional area, and a center core (45) having a substantially-quadrilateral shaped cross-sectional area which is to be inserted into the third tubular portion (9) at its portion into which the second convex portions (41c) of the movable melding die (41) are not inserted.

The corrugated concave-and-convex surface (42a) in the fixed molding die (42) is provided with level-difference portions (42b) which come into contact with the slide core (43) to form portions having no thickness.

The awning-member molded article (1) is provided with through holes (31) (32) (33) (34), at the four corner portions which form the corner portions of the quadrilateral shape when viewed in a plane (the lower end portion of the first basic element (2) in the direction of the edge line, the right lower end portion of the second basic element (3), the rear lower end portion of the third basic element (4), and the upper end portion of the fourth basic element (5) in the direction of the edge line). Thus, as illustrated in FIG. 9, awning-member molded articles (1) adjacent to each other can be coupled to each other, through joints (35) (36) (37) having protrusions (35a) (36a) (37a) to be fitted into the through holes (31) (32) (33) (34) in one of the awning-member molded articles (1) and, further, having protrusions (35b) (36b) (37b) to be fitted into the through holes (31) (32) (33) (34) in the other awning-member molded article (1).

As illustrated in FIG. 9, as the joints (35) (36) (37), there are employed first joints (35) each having two upward protrusions (35a) (35b) for coupling the first basic element (2) and the second and third basic elements (3) (4) to each other (the basic elements adjacent to each other leftwardly and rightwardly and forwardly and rearwardly), a second joint (36) having a single upward protrusion (36a) and a single downward protrusion (36b) for coupling the first basic element (2) and the fourth basic element (5) to each other (the basic elements which are adjacent to each other upwardly and downwardly while being deviated from each other forwardly and rearwardly and leftwardly and rightwardly), third joints (37) each having a single upward protrusion (37a) and a single downward protrusion (37b) for coupling the second and third basic elements (3) (4) and the fourth basic element (5) to each other (the basic elements which are adjacent to each other upwardly and downwardly while being arranged forwardly and rearwardly and leftwardly and rightwardly). These joints (35) (36) (37) can be obtained as injection-molded members made of a synthetic resin.

In assembling an awning using the joints (35) (36) (37), for example, awning-member molded articles (1) can be arranged to the right and at the rear of an awning-member molded article (1) placed at a predetermined position, and the articles (1) can be coupled to each other through first joints (35), then another awning-member molded article (1) can be arranged above the three awning-member molded articles (1) having been coupled to each other, and the articles (1) can be coupled to each other through first and second joints (35) (36). By repeatedly performing these operations, it is possible to place an arbitrary number of awning-member molded articles (1) leftwardly and rightwardly, forwardly and rearwardly, and upwardly and downwardly. This enables assembling the awning with extremely high efficiency.

Figure 10:
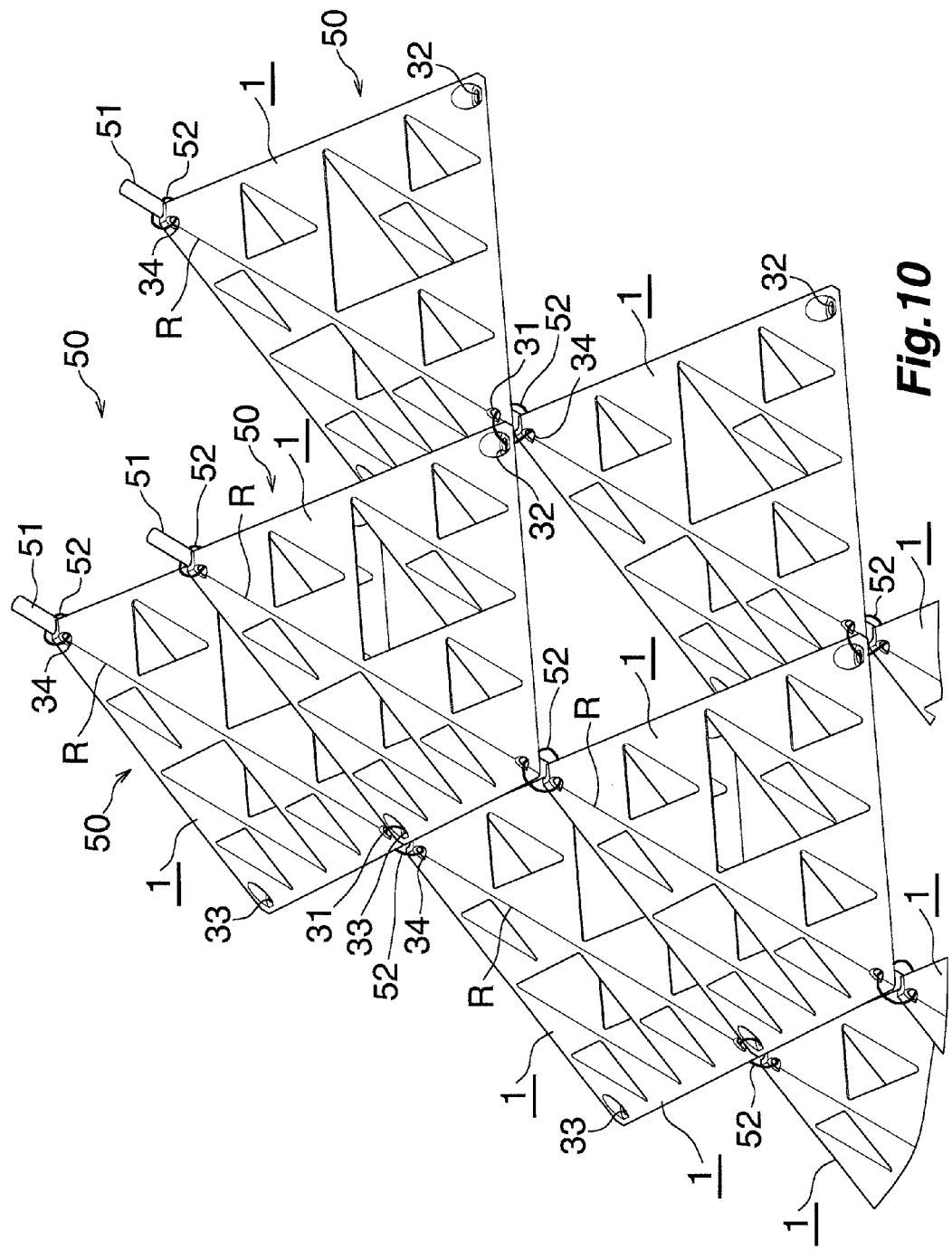
FIG. 10 is a perspective view illustrating a portion of another embodiment of an awning which is assembled using a plurality of awning-member molded articles according to the present invention.

Formation of awnings is not limited to those using joints (37) and, instead thereof, it is also possible to employ reinforcing members (51) and wires (52) for forming an awning, as illustrated in FIG. 10.

Referring to FIG. 10, a predetermined number of awning-member molded articles (1) are placed, such that their edge lines (R) are continuous with each other, thereby forming a single unit (50). This unit (50) is supported by a reinforcing member (51) extending in the direction of the edge line (R). Further, a plurality of units (50) obtained as described above are placed to be arranged, thereby forming an awning.

In this case, awning-member molded articles (1) adjacent to each other are secured to each other, using the through holes (31) (32) (33) (34) provided in these awning-member molded articles (1), by inserting a wire (52) into the through hole (31) (32) (33) (34) in one of the awning-member molded articles (1) and into the through hole (31) (32) (33) (34) in the other awning-member molded article (1), and by coupling both the ends of the wire (52) to each other. In this case, the wire (52) can be wound around the reinforcing member (51) for coupling the reinforcing member (51) to the respective awning-member molded articles (1). The reinforcing member (51) and the respective awning-member molded articles (1) can be preliminarily coupled to each other, through an adhesive agent and the like.

In cases of installing an awning using units (50) formed as described above, it is possible to fabricate a frame along outer edge portions of the portion desired to be covered with the awning using a supporting member made of a high-strength material such as metal (for example, an U-shaped iron angle), further, to form holes for passing reinforcing members (51) thereinto, at desired intervals, in two sides of the frame which oppose to each other, and to secure the end portions of the reinforcing members (51) to the frame. In this manner, it is possible to fabricate an awning according to the target area and shape. Further, by supporting the frame at its four corners by metal supporting columns (for example, aluminum angles), it is possible to install the awning at a predetermined height.

With such an awning obtained as described above, due to the use of the reinforcing members (51), it is possible to facilitate the assembling thereof, it is possible to easily adapt the awning to the size and the shape of the area in which it is desired to be installed, and further, it is possible to adapt the awning to the time and the direction at and in which solar radiation is desired to be intercepted. Further, due to the coupling using the reinforcing members (51), it is possible to prevent the awning from partially falling as bulks, due to accumulation of snow and falling of foreign substances from thereabove. This can improve the strength of the awning.

Such an awning formed from a plurality of the aforementioned awning-member molded articles (1) which are continuously installed can be installed at any place all over the world. This enables cooling cities without consuming energy, thereby contributing to resolutions of the heat-island phenomenon. In order to enhance this effect, it is necessary to install the awning at a proper angle. This necessitates determining a reference point at first, and then, setting a reference angle.

Figure 11:
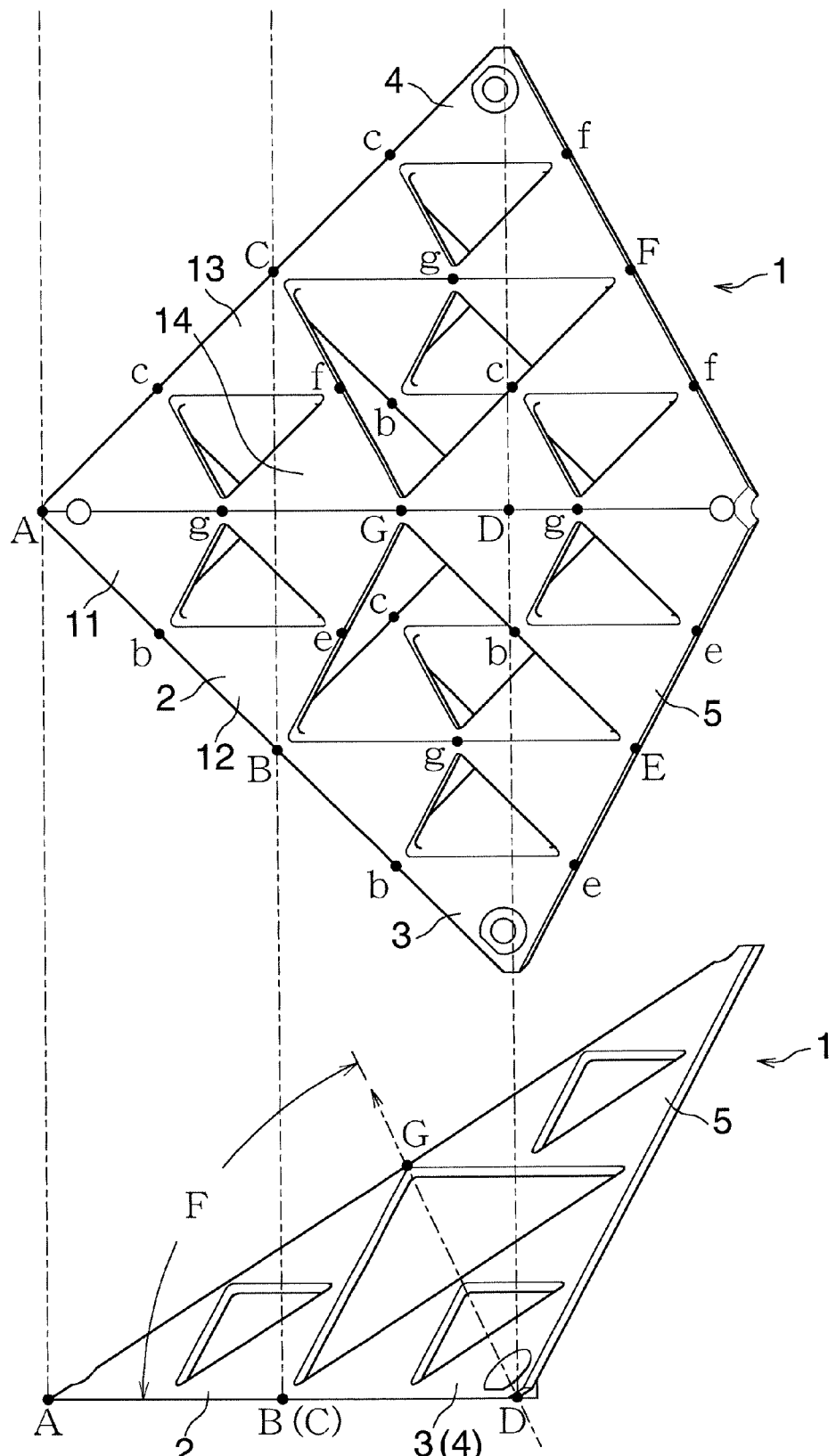
FIG. 11 is a view illustrating a first aspect of installation of an awning according to the present invention.

In a first aspect of installation of an awning according to the present invention, the shape of the awning-member molded article (1) illustrated in FIG. 11 is utilized. Referring to FIG. 11, the first basic element (2) (and the other basic elements (3) (4) (5) similarly thereto) in the awning-member molded article (1) is formed from dihedrons having a quadrilateral shape when viewed in a plane as minimum units. Further, the first basic element (2) is constituted by a first dihedron (11) at a reference position, a second dihedron (12) which is adjacent to the first dihedron (11) such that they share a single vertex b with each other, and their respective single sides exist on the same straight line, a third dihedron (13) which is adjacent to the first dihedron (11) such that this third dihedron (13) shares another vertex c of the first dihedron (11) therewith and, also, exists on the same straight line as that of another side of the first dihedron (11), and a fourth dihedron (14) which is adjacent, at its respective single sides, to the second and third dihedrons (12) (13) such that they share respective single vertexes e and f with each other and, also, their respective single sides exist on the same straight lines and, further, which is adjacent to the first dihedron (11) such that they share a single vertex g with each other and their diagonal lines exist on the same straight line.

Further, the awning-member molded article (1) is formed from these four dihedrons (11) (12) (13) (14), as a basic element. Further, the awning-member molded article (1) is constituted by a first basic element (2) at a reference position, a second basic element (3) which is adjacent to the first basic element (2) such that they share a single vertex B with each other, and their respective single sides exist on the same straight line, a third basic element (4) which is adjacent to the first basic element (2) such that this third basic element (4) shares another vertex C of the first basic element (2) therewith and, also, exists on the same straight line as that of another side of the first basic element (2), and a fourth basic element (5) which is adjacent at its respective sides to the second and third basic elements (3) (4) such that they share respective single vertexes E and F with each other, and their respective single sides exist on the same straight lines and, further, which is adjacent to the first basic element (2) such that they share a single vertex G with each other, and their diagonal lines exist on the same straight line.

That is, each basic element (2) (3) (4) (5) includes a vertex which is shared with a basic element adjacent thereto and a vertex which is not shared with an adjacent basic element. By focusing on this fact, assuming that the vertexes which the first basic element (2) share with the second, third, and fourth basic elements (3) (4) (5) are B, C, and G, respectively, and the other vertex of the first basic element (2) is A, when the triangular shape ABC having the two sides AB and AC as the bottom sides is installed substantially horizontally, a point D is determined such that this point D and the point A are symmetrical about the side BC in the horizontal direction, and the angle F formed by ∠ADG is defined as a reference angle.

When the point D exists on a line at an angle equal to the elevation angle of the sun, the awning-member molded article (1) is oriented in the direction which maximizes light interception, thereby maximizing the effects thereof. In cases where the awning-member molded article (1) should be installed in any place all over the world, the angle of the sun is varied depending on the latitude. Therefore, the angle F can be expressed by using the latitude as a parameter.

This will be described by exemplifying specific numerical values.

In Japan, from the end of July to the beginning of August, and during the time period from 12:00 to 14:00, the air temperature is highest and, also, there are strong solar radiation. During this season and time period, it is possible to provide maximum effects, by setting that F is equal to the elevation angle of the sun at 72 degrees in the capital region, namely, around a north latitude of 36 degrees, and by setting that F is equal to the elevation angle of the sun at $108-\theta$, in a region at a north latitude of $\theta$ degrees.

In a region at a north latitude or a south latitude of $\theta$ degrees, during the summer season, there are largest amounts of direct sunlight at the timing of the summer solstice, but the ground temperature of the earth becomes higher during a single month from one month to two months after the summer solstice. If the direct sunlight from the sun at the culmination altitude can be intercepted at this time, it is possible to prevent temperature rises on the ground surface. In a region at a north latitude of $\theta$ degrees, at the time of the summer solstice, the culmination altitude of the sun is $90-(\theta-23)$ degrees (in actual, the value in the parenthesis is $\theta-23.4$, but 0.4 degrees hardly affects the effect thereof and, therefore, this value is assumed to be $\theta-23$). However, the air temperature is highest during a single month from one month no two months after the summer solstice, and the air temperature is highest about 1.5 months after the summer solstice. At this time, the sun altitude is lower by 5 degrees than the culmination altitude thereof at the time of the summer solstice and, thus, the sun altitude is $(90-(\theta-23)-5)$ degrees, which nearly equals to $(108-\theta)$ degrees.

Fox the directions of the sun from noon to 13:00, by providing an awning at an angle corresponding thereto, it is possible to maximize the direct-sunlight interception effect thereof. Accordingly, it is necessary that the awning is placed such that there is no gap therein when the awning is viewed in this direction (which is defined as a first direction), at an infinite distance therefrom. Such a shape can be attained by making the direction from the point D to the point G in FIG. 11 at an angle equal to the angle of direct sunlight from the sun, namely, on a line at an angle of 108 (or 108.4)–$\theta$.

In cases where it is desired to intercept sunlight at a different time of year, that is, in cases where it is desired to maximize the interception effect at a different time of year from 1.5 months after the summer solstice as described above, it is necessary to perform appropriate adjustments therefor. If it is desired to maximize the interception effect one month after the summer solstice (i.e., a half month before the time of a highest temperature), the aforementioned angle should be increased by 3 degrees. If it is desired to maximize the interception effect two months after the summer solstice (i.e., a half month after the time of a highest temperature), the aforementioned angle should be decreased by 3 degrees.

In cases where the targeted time period during which sunlight is desired to be intercepted is in the morning or afternoon, rather than from noon to 13:00, the direction of DG in FIG. 11 should be made coincident with the direction to the sun, and the angle should be increased or decreased according to the difference between the desired time and noon, by 12 degrees per hour.

That is, using the latitude $\theta$ of the place in which the awning-member molded article (1) should be installed, the reference angle F (degrees) can be set to $113-S-\theta \leq F \leq 113+T-\theta$, in cases of $\theta \geq 23$, and can be to $F=90\pm10$ in cases of $\theta<23$. In this case, S is a constant within the range of 5 to 10, and T is a constant within the range of 0 to 5.

$\theta$ can be either the north latitude or the south latitude.

In cases of T=0, "$113+T-\theta$" corresponds to the sun altitude at the time of the summer solstice. Further, in cases where S≈5, "$113-S-\theta$" corresponds to the sun altitude at the time the air temperature is highest, during the summer. Accordingly, by selecting F in such a way as to satisfy $108-\theta \leq F \leq 113-\theta$, it is possible to provide a preferable awning in a region at a latitude of $\theta$.

"S+T" is an index corresponding to the types of awnings required for covering regions all over the world. In cases of S=5 and t=0, which is the aforementioned preferable condition, if an attempt is made to cover all regions at $\theta \geq 23$, there is a need for awnings of $(90-23)/5 \approx 14$ types. On the other hand, in cases of T=0 and S=10, for regions at $\theta \geq 23$, there is a need for awning-member molded articles (1) of only $(90-23)/10 \approx 7$ types, although there is induced a somewhat larger deviation from an optimum value for the sun altitude. In cases of T=5 and S=10, for regions at θ≥23, there is a need for awning-member molded articles (1) of only (90−23)/15≈5 types.

Eventually, a condition for optimizing the awning effect is 108−θ≤F≤113−θ, for θ≥23. For θ≥23, "113−S−θ≤F≤113+T−θ" (wherein S is a constant within the range of 5 to 10, and T is a constant within the range of 0 to 5) is a proper condition, allowing for ease of the fabrication of awning-member molded article (1) and ease of the storage and maintenance thereof.

Further, according to the present invention, the awning-member molded article (1) is formed to be an injection-molded article made of a synthetic resin, and the second basic element (3) and the third basic element (4) are coupled to each other at their portions abutting against each other. This can increase the strength thereof. Furthermore, since these abutting portions (the portion indicated by the arrow Q in FIG. 4) are coincident with the point D in the aforementioned condition and, thus, the point D is an actually-existing point which can be identified in the awning-member molded article (1), rather than being an imaginary point, it is possible to easily determine the angle F in the awning-member molded article (1).

By installing the awning as described above, the awning can be easily installed at an appropriate angle, in installing the awning in different regions all over the world. In installing the awning in different regions all over the world, in order to facilitate the installation thereof at an appropriate angle, it may be installed as follows. Hereinafter, there will be described installation thereof which utilizes units (50) supported by reinforcing members (51) illustrated in FIG. 10 and, therefore, can be easily implemented.

In the following description about a second aspect of installation, for convenience of description, FIG. 12 will be regarded as a front view, and FIG. 13 will be regarded as a side view, wherein the terms "left", "right", "upper" and "lower" refer to left, right, upper, and lower sides defined with respect to FIG. 12, and the terms "front" and "rear" refer to directions orthogonal thereto (the term "front" refers to a side closer to the front side of the paper plane in FIG. 12). Accordingly, in FIG. 13, right, left, upper, and lower sides therein correspond to front, rear, upper, and lower sides. Further, In FIG. 14, right, left, upper, and lower sides therein correspond to front, rear, left, and right sides. These "front view" and "side view" are defined for convenience, and it is not necessary that the front surface of the installed awning is coincident with this "front surface".

Figure 13:
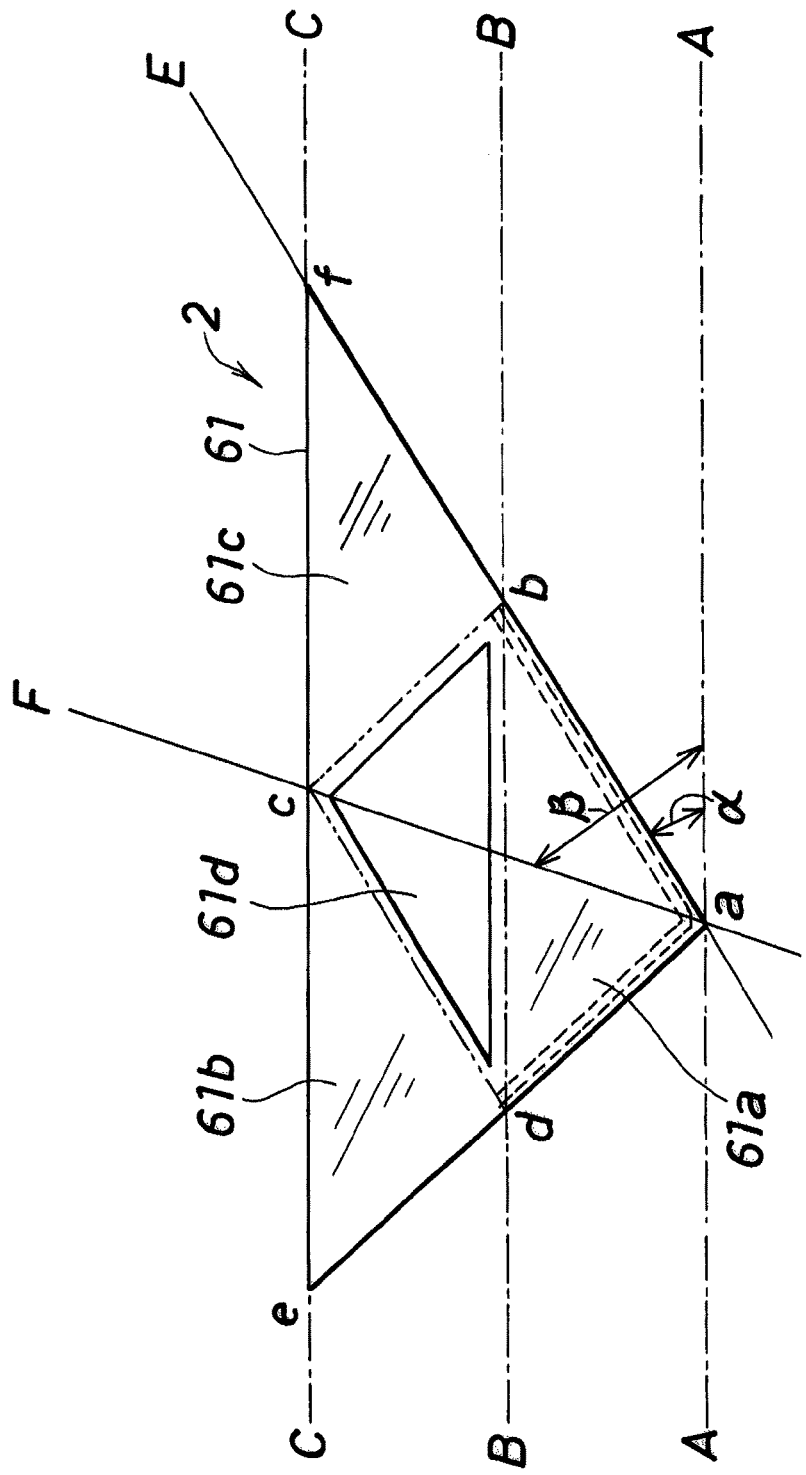
FIG. 13 is a side view of the same.

In the second aspect of installation of an awning according to the present invention, the shape of the awning-member molded article (1) illustrated in FIG. 13 is utilized.

Figure 12:
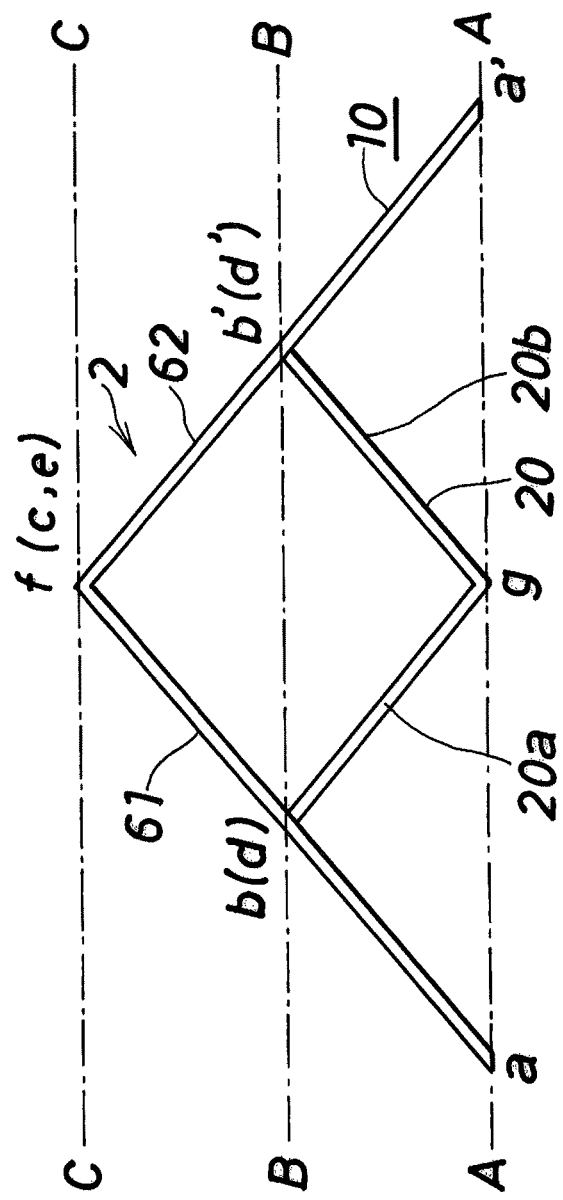
FIG. 12 is a view (a front view) illustrating a second aspect of installation of an awning according to the present invention.

FIG. 12 illustrates the shape thereof (a front view) when viewed in a first horizontal direction (a front side) in which the areas of opening portions are maximized. A basic element (2) is a tetrahedron constituted by a larger dihedron (10) formed from two larger triangular portions (61) (62) coupled to each other in a reversed-V shape, and a smaller dihedron (20) which is formed from two smaller triangular portions (20*a*) (20*b*) coupled to each other in a V shape and, also, is coupled to the larger dihedron (10) such that the smaller dihedron (20) and the upper half part of the larger dihedron (10) are symmetrical with each other.

FIG. 13 illustrates the shape thereof (a side view) when viewed in a second horizontal direction (a left side in FIG. 12) orthogonal to the first horizontal direction, wherein there is illustrated the larger triangular portion (61). In this figure, a straight line E extends from a point a on the installation surface A to form a sun altitude α degrees in the winter season, and a straight line F extends from the point a, similarly, to form a sun altitude β degrees in the summer season. The intersection b of the straight lines B and E, and the intersection c of the straight lines C and F are connected to form a straight line bc and, in parallel with this straight line bc, a straight line is drawn from the point a such that this straight line intersect with the straight lines B and C. The intersections of this straight line and the straight lines B and C are defined as d and e, respectively. The intersection of the straight lines C and E is defined as f. The straight line ac forms a line which equally divides the larger triangular portion (61) into two parts. The triangular shape abd, the triangular shape bfc, and the triangular shape dce are made of an awning material, while the triangular shape bcd is an opening. Thus, when the basic element (2) is viewed in the second horizontal direction orthogonal to the first horizontal direction, its shape is formed from the lower reversed-triangular portion abd (61*a*) placed at a lower side, and the two upper triangular portions dce (61*b*) and bfc (61*c*) which are placed at an upper side to form a triangular-shaped opening portion bcd (61*d*) between themselves and the lower reversed-triangular portion abd (61*a*).

Figure 15:
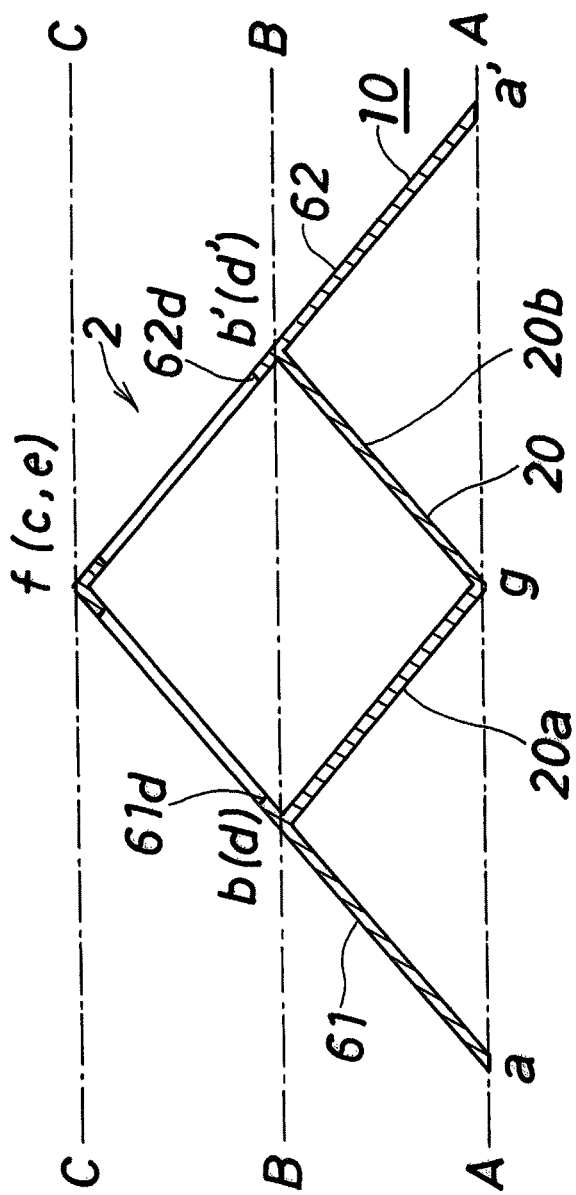
FIG. 15 is a cross-sectional view of the same.

When the basic element (2) is viewed from the right side in FIG. 12, its shape (the larger triangular shape (62)) is also the same as the shape illustrated in FIG. 13. Accordingly, as illustrated in FIG. 15, the larger triangular portion (61) in the left side is provided with the opening portion bcd (61*d*) and, also, the larger triangular portion (62) in the right side is provided with an opening portion b'c'd' (62*d*), and these two opening portions (61*d*) (62*d*) are at the same height and, therefore, coincide with each other in FIG. 13. Accordingly, sunlight in the direction toward the paper plane of FIG. 13 and in the lateral direction in FIG. 15 can pass through one opening portion (61*d*) and, further, can pass through the other opening portion (62*d*) without being intercepted halfway therethrough.

Referring to FIG. 12 and FIG. 13, "A" designates the awning installation surface, and the vertexes "a" and "a'" of the larger triangular portions (61) (62), and the edge line "g" of the smaller dihedron (20) exist on this installation surface. Moreover, "C" designates the height of the edge line (the awning height), and the other two vertexes "e" and "f" of the larger triangular portions (61) (62) and the point c just at the middle between these vertexes, which form the edge line of the larger dihedron (10), exist on this installation surface. Further, "B" designates a ½-height surface, and the points b, d, b', and d' which are coupling portions between the larger dihedron (10) and the smaller dihedron (20) exist on this ½-height surface. Further, "A", "B", and "C" are equally spaced apart from each other and are parallel with each other.

Figure 14:
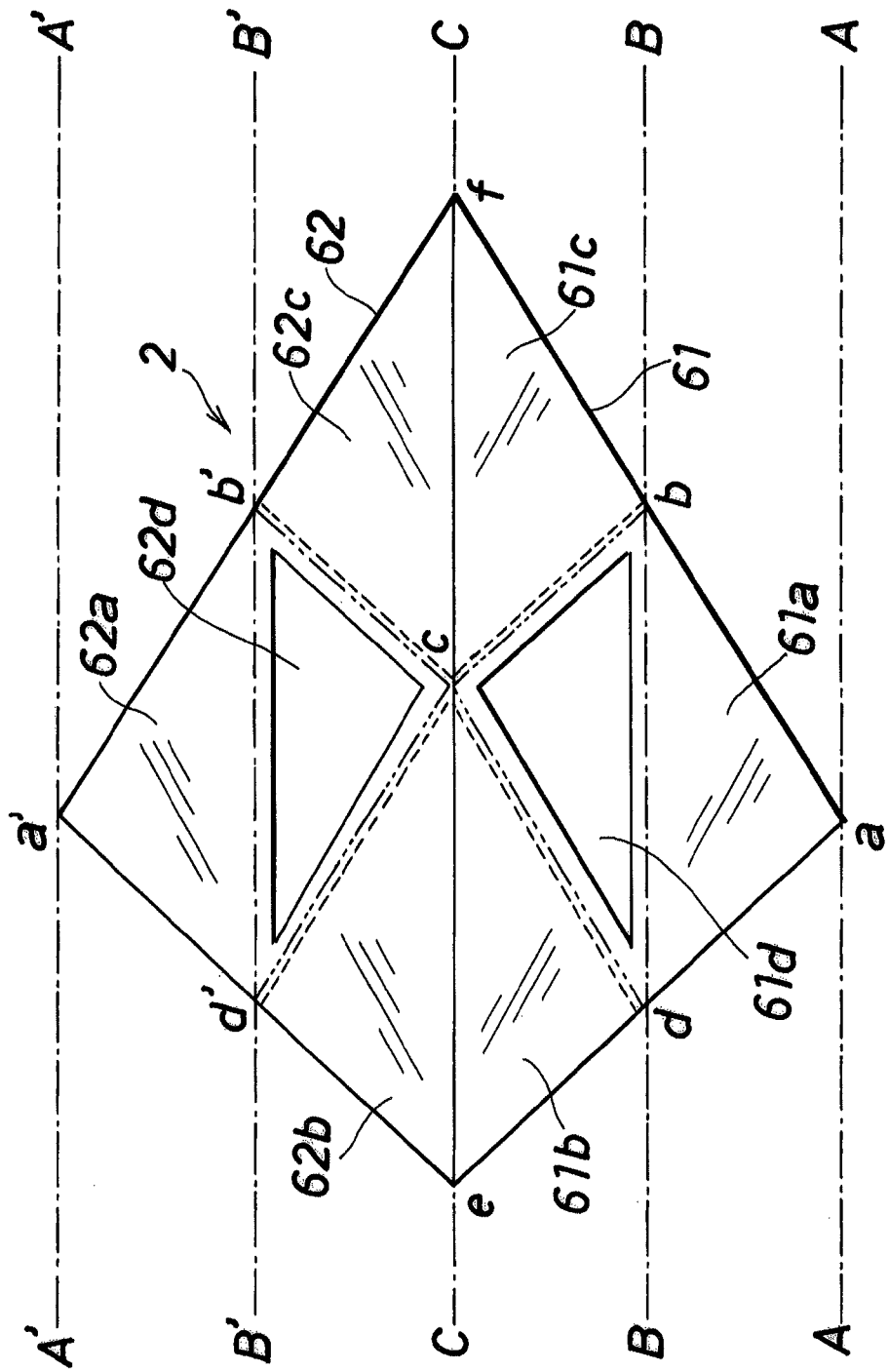
FIG. 14 is a plan view of the same.

FIG. 14 is a plan view of the basic element (2) in FIG. 12 and FIG. 13 when viewed from thereabove. The straight lines A, B, C and the points a, b, c, d, e, and f are the same as those illustrated in FIG. 13, and the straight lines A' and B' and the points a', b', and d' are coincident portions in FIG. 13. Similarly to the larger triangular portion (61) illustrated in FIG. 13, the larger triangular portion (62), which is not illustrated in FIG. 13, includes a lower reversed-triangular portion a'b'd' (62*a*) placed at a lower side, and two upper triangular portions d'ce (62*b*) and b'fc (62*c*) which are placed at an upper side to form a triangular opening portion b'cd' (62*d*) between themselves and the lower reversed-triangular portion a'b'd' (62*a*).

The parallel lines A, B, C, B', and A' are equally spaced apart from each other, and the interval therebetween is not particularly limited, but, in view of the fabrication thereof, this interval is preferably such that the triangular shape abd forms a substantially regular triangular shape when viewed in the direction of FIG. 14.

Regarding the opening portions bcd (61*d*) and b'cd' (62*d*) which have a triangular shape, in actual, these opening portions (61*d*) (62*d*) are properly formed to have a size smaller than those of the awning material portions, and the awning materials are coupled to each other at respective points. Referring to FIG. 13 and FIG. 14, the actual opening portions (61*d*) (62*d*) are indicated by solid lines, and imaginary lines necessary for forming these opening portions (61*d*) (62*d*) are indicated by two-dot chain lines.

Figure 16:
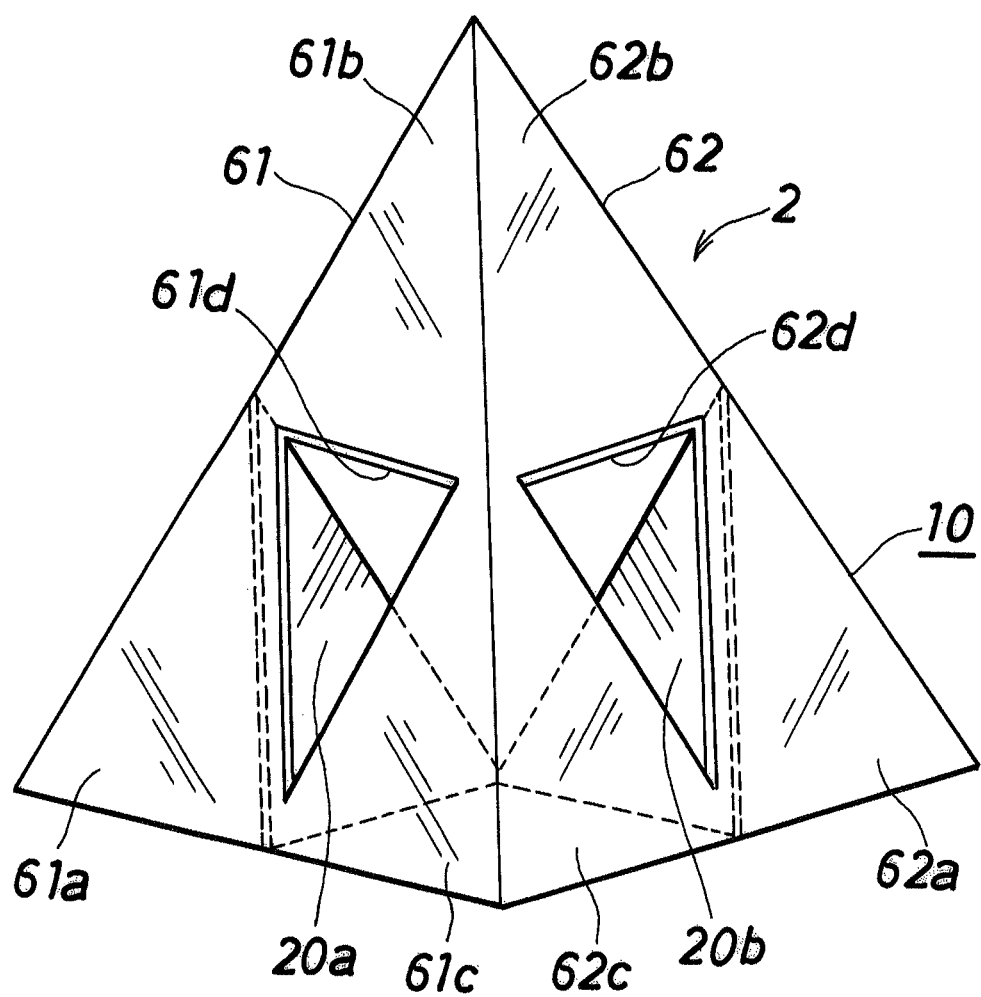
FIG. 16 is a perspective view of the same.

FIG. 16 illustrates an example where the basic element (2) is viewed in an oblique direction. This basic element (2) has largely-different three-view drawings, as illustrated in FIGS. 12 to 14 and, therefore, when viewed in an oblique direction, the view thereof is largely varied depending on the direction and the angle in and at which it is viewed. For example, when the basic element (2) is viewed obliquely from thereabove, as illustrated in FIG. 16, the triangular-shaped opening portions (61*d*) (62*d*) are interrupted by the triangular portions (20*a*) (20*b*) of the smaller dihedron (20) and, depending on the direction, the gaps which allow sunlight to pass therethrough are varied.

Accordingly, even though there are gaps between the respective basic elements (2), by placing basic elements (2) such that these gaps are nullified when they are viewed in a maximum light-interception direction which is inclined by a predetermined angle for the summer season and, further, by placing the basic elements (2) such that, when they are viewed in the direction from the sun during the winter season, there is nothing which intercepts sunlight except the thickness of the awning member, and all of the basic elements (2) form gaps, it is possible to provide a desired awning.

In installing the awning, as illustrated in FIG. 13, the straight line af forming a single side of the larger triangular portion (61), and the straight line ef (parallel to the installation surface A) forming the edge line of the larger dihedron (10) are caused to from an angle equal to the angle $\alpha$ (degrees) corresponding to a sun altitude during the winter season. The straight line ac which equally divides the larger triangular portion (61) into two parts and the straight line ef (parallel to the installation surface A) which forms the edge line of the larger dihedron (10) are caused to form an angle equal to the angle $\beta$ (degrees) corresponding to a sun altitude during the summer season ($\beta > \alpha$). This enables intercepting sunlight during the summer season and, also, allows sunlight to easily pass therethrough during the winter season, which facilitates installing the awning at appropriate angles, in installing the awning in different regions all over the world.

Figure 17:
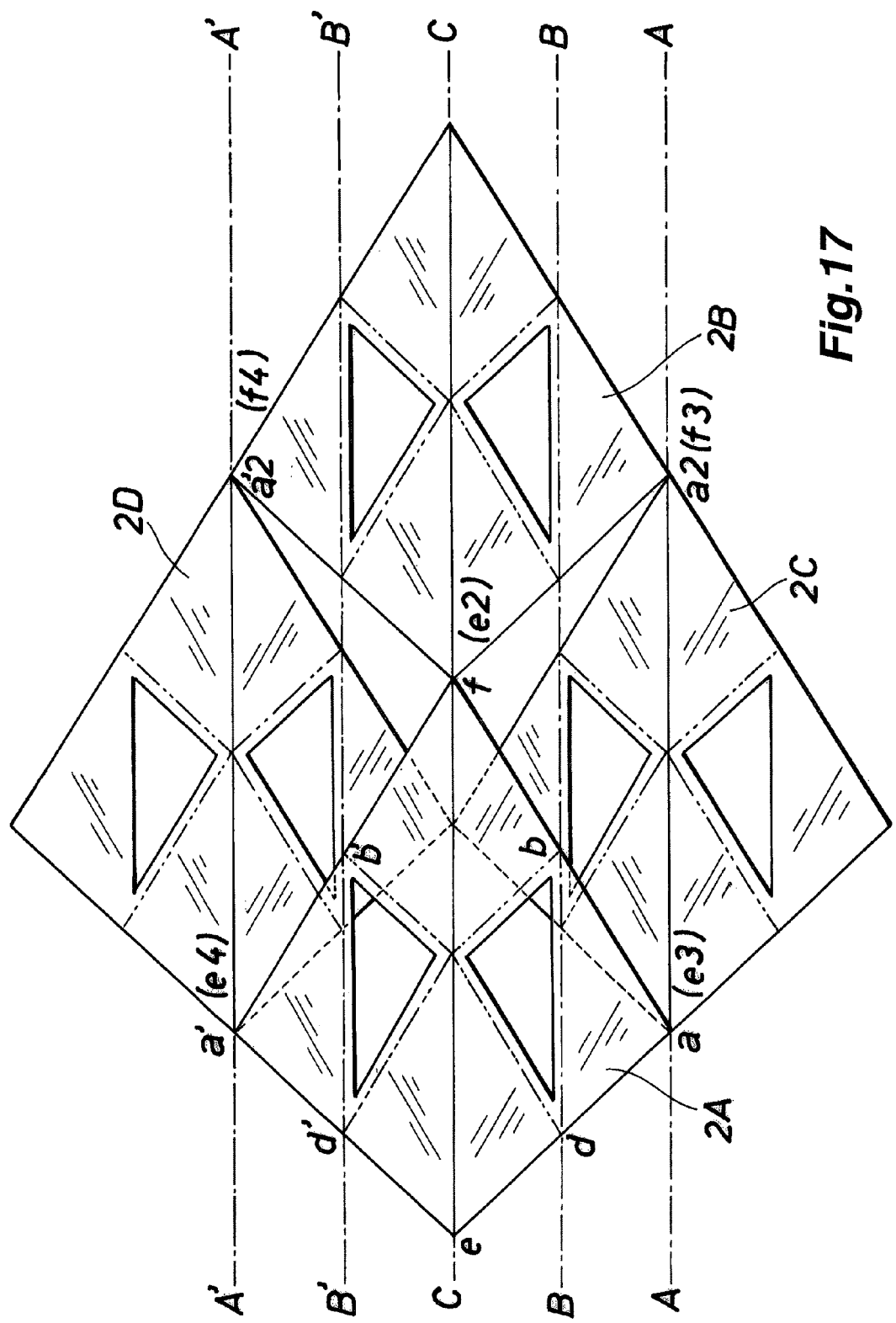
FIG. 17 is a plan view of an awning in the second aspect of installation, wherein an edge line of the awning is placed at the center, and four tetrahedrons are coupled to each other.

FIG. 17 is a plan view of a structure constituted by four basic elements (2) illustrated in FIG. 14 which are coupled to each other (an example of an awning-structure member).

This awning-structure member includes, as basic elements, four basic elements (2A) (2B) (2C) (2D) which are constituted by a first basic element (2A) at a reference position, a second basic element (2B) which is placed at the front of the first basic element (2A) such that "f" in the first basic element (2A) and "e2" in the second basic element (2B) are coincident with each other and coupled to each other, a third basic element (2C) which is placed to the right of the first basic element (2A) and the second basic element (2B), such that "a" in the first basic element (2A) and "e3" in the third basic element (2C) are coincident with each other and coupled to each other and, also, "a2" in the second basic element (2B) and "f3" in the third basic element (2C) are coincident with each other and coupled to each other, and a fourth basic element (2D) which is placed to the left of the first basic element (2A) and the second basic element (2B), such that "a'" in the first basic element (2A) and "e4" in the fourth basic element (2D) are coincident with each other and coupled to each other and, also, "a'2" in the second basic element (2B) and "f4" in the fourth basic element (2D) are coincident with each other and coupled to each other.

The third basic element (2C) and the fourth basic element (2D) are placed on the lower sides the first basic element (2A) and the second basic element (2B), the edge line (the straight line C) in the third basic element (2C) and the straight lines A in the first basic element (2A) and the second basic element (2B) exist on the same straight line, and the edge line (the straight line C) in the fourth basic element (2D) and the straight lines A in the first basic element (2A) and the second basic element (2B) exist on the same straight line.

By replacing each of the four basic elements (2A) (2B) (2C) (2D) in FIG. 17 with the awning-structure member constituted by the four basic elements (2A) (2B) (2C) (2D) illustrated in FIG. 17, it is possible to provide an awning-structure member constituted by 16 basic elements (2A) (2B) (2C) (2D). By repeating this, it is possible to provide an awning with a fractal structure employing a plurality of the basic elements (2) illustrated in FIGS. 12 to 16, as minimum units.

The angle $\alpha$ (degrees) illustrated in FIG. 13 is varied depending on the latitude at the region in which this awning is used.

In the Northern Hemisphere, the lowest sun altitude is "90−(the latitude+23)=$\alpha$min", which is the sun altitude at the time of the winter solstice. It is preferable that $\alpha$ is larger than this $\alpha$min and falls within a range equal to or less than $\alpha$min+10, wherein "$\alpha$min+10" is the sun altitude at the time of 1 to 2 months after the winter solstice and, at this time, the air temperature is actually lowest.

The same applies in the Southern Hemisphere, but the direction of the awning (the direction of the straight line C in FIG. 13) should be reversed from that in the Northern Hemisphere.

The angle $\beta$ is also varied depending on the latitude in the region in which this awning is used. Further, the angle $\beta$ is varied depending on whether the latitude is higher or lower than 23 degrees, which is the inclination of the axis of the Earth (which is actually 23.4 degrees, but it is defined as 23 degrees since 0.4 degrees hardly affects the effect thereof).

In a region at a latitude larger than 23 degrees, in the Northern Hemisphere, the highest sun altitude is "90−(the latitude−23)=$\beta$max", which is the sun altitude at the time of the summer solstice. It is preferable that $\beta$ is smaller than this $\beta$max and falls within a range equal to or more than $\beta$max−10, wherein "$\beta$max−10" is the sun altitude at the time of 1 to 2 months after the summer solstice and, at this time, the air temperature is actually highest.

The same applies in the Southern Hemisphere, but the direction of the awning (the direction of the straight line C in FIG. 13) should be reversed from that in the Northern Hemisphere.

In a region at a latitude smaller than 23 degrees, in the Northern Hemisphere, the highest sun altitude is "90−(23−the latitude)=$\beta$max", which is the sun altitude at the time of the summer solstice. It is preferable that $\beta$ is smaller than this $\beta$max and falls within a range equal to or more than $\beta$max−10, wherein "$\beta$max−10" is the sun altitude at the time of 1 to 2 months after the summer solstice and, at this time, the air temperature is actually highest.

The same applies in the Southern Hemisphere, but the direction of the awning (the direction of the straight line C in FIG. 13) should be reversed from that in the Northern Hemisphere.

A single side of a triangular shape is equal to or less than 100 mm and, preferably, equal to or less than 50 mm. In this manner, it is possible to enhance the awning effect (it is possible to reduce the temperature rise at the ground surface thereunder).

INDUSTRIAL APPLICABILITY

According to the present invention, it is possible to provide an awning-member molded article and an awning which have excellent strengths and can be easily fabricated. By using the awning-member molded article and the awning, it is possible to efficiently suppress temperature rises without consuming energy, thereby contributing to resolutions of the heat-island phenomenon.

The invention claimed is:

1. An awning-member molded article having a fractal structure formed by injection molding, and having light interception means and ventilation means, the awning-member molded article consisting of:
   four basic elements that each have a dihedral shape constituted by two triangular-shaped plate portions to form a quadrilateral shape when viewed in a plane, such that the basic elements are placed adjacent to each other leftwardly and rightwardly, forwardly and rearwardly, and upwardly and downwardly, the four basic elements including
   a first basic element at a reference position,
   a second basic element placed to either left or right of the first basic element,
   a third basic element placed at either front or rear of the first basic element, and
   a fourth basic element placed above the first to third basic elements,
   the respective basic elements being placed such that gaps are formed between the basic elements, the gaps being nullified when viewed in a maximum light-interception direction which is inclined by a predetermined angle, so that the ventilation means is obtained by the gaps and the light interception means is obtained by the nullified gap, wherein
   a right or left corner of the first basic element is coupled to a left or right corner of the second basic element, a rear or front corner of the first basic element is coupled to a front or rear corner of the third basic element, a top corner of the first basic element is coupled to a bottom corner of the fourth basic element, a top corner of the second basic element is coupled to a right or left corner of the fourth basic element and a top corner of the third basic element is coupled to a rear or front corner of the fourth basic element during injection molding, and a rear or front corner of the second basic element is coupled to a right or left corner of the third basic element.

2. An awning-member molded article having a fractal structure formed by injection molding, and having light interception means and ventilation means, the awning-member molded article comprising:
   four basic elements that each have a dihedral shape constituted by two triangular-shaped plate portions to form a quadrilateral shape when viewed in a plane, such that the basic elements are placed adjacent to each other leftwardly and rightwardly, forwardly and rearwardly, and upwardly and downwardly, the four basic elements including
   a first basic element at a reference position,
   a second basic element placed to either left or right of the first basic element,
   a third basic element placed at either front or rear of the first basic element, and
   a fourth basic element placed above the first to third basic elements,
   the respective basic elements being placed such that gaps are formed between the basic elements, the gaps being nullified when viewed in a maximum light-interception direction which is inclined by a predetermined angle, so that the ventilation means is obtained by the gaps and the light interception means is obtained by the nullified gap, wherein
   a right or left corner of the first basic element is coupled to a left or right corner of the second basic element, a rear or front corner of the first basic element is coupled to a front or rear corner of the third basic element, a top corner of the first basic element is coupled to a bottom corner of the fourth basic element, a top corner of the second basic element is coupled to a right or left corner of the fourth basic element and a top corner of the third basic element is coupled to a rear or front corner of the fourth basic element during injection molding, and a rear or front corner of the second basic element is coupled to a right or left corner of the third basic element, and
   wherein each basic element includes four dihedrons having a quadrilateral shape when viewed in a plane, such that the dihedrons are placed adjacent to each other leftwardly and rightwardly, forwardly and rearwardly, and upwardly and downwardly, each basic element including
   a first dihedron at a reference position,
   a second dihedron placed to either right or left of the first dihedron,
   a third dihedron placed at either front or rear of the first dihedron, and
   a fourth dihedron placed above the first to third dihedrons, and
   the respective dihedrons are coupled to each other at portions abutted against each other during injection molding.

3. The awning-member molded article according to claim 1, wherein
   the awning-member molded article is formed through injection molding, using a first molding die which has a convex portion that conforms to a gap, the first molding die being brought into contact with the basic elements at a peak side, a second molding die which has a corrugated concave-and-convex portion, the second molding die being brought into contact with the basic elements at a concave side of the awning-member molded article, and a slide core adapted to move in a direction of an edge line of the basic elements, and any one of the first and second molding dies is a fixed molding die, and the other one thereof is a movable molding die, and the molding dies are placed opposite to each other, such that the maximum light-interception direction of the awning-molded article is coincident with an axial direction.

4. An awning comprising a plurality of the awning-member molded articles according to claim 1, such that the awning-member molded articles are installed continuously.

5. An awning comprising a plurality of awning-member molded articles, each awning-member molded article having a fractal structure formed by injection molding, and having light interception means and ventilation means, the awning-member molded article comprising:

four basic elements that each have a dihedral shape constituted by two triangular-shaped plate portions to form a quadrilateral shape when viewed in a plane, such that the basic elements are placed adjacent to each other leftwardly and rightwardly, forwardly and rearwardly, and upwardly and downwardly, the four basic elements including a first basic element at a reference position, a second basic element placed to either left or right of the first basic element, a third basic element placed at either front or rear of the first basic element, and a fourth basic element placed above the first to third basic elements, the respective basic elements being placed such that gaps are formed between the basic elements, the gaps being nullified when viewed in a maximum light-interception direction which is inclined by a predetermined angle, so that the ventilation means is obtained by the gaps and the light interception means is obtained by the nullified gap, wherein a right or left corner of the first basic element is coupled to a left or right corner of the second basic element, a rear or front corner of the first basic element is coupled to a front or rear corner of the third basic element, a top corner of the first basic element is coupled to a bottom corner of the fourth basic element, a top corner of the second basic element is coupled to a right or left corner of the fourth basic element and a top corner of the third basic element is coupled to a rear or front corner of the fourth basic element during injection molding, and a rear or front corner of the second basic element is coupled to a right or left corner of the third basic element, wherein the awning-member molded articles are installed continuously, and wherein each awning-member molded article has four corner portions provided with through holes, the four corner portions forming a quadrilateral shape when viewed in a plane.

6. The awning according to claim 5, wherein awning-member molded articles adjacent to each other are coupled to each other, through a joint having a protrusion to be fitted in a through hole in one of the awning-member molded articles and a protrusion to be fitted in a through hole in the other awning-member molded article.

7. The awning according to claim 5, wherein a predetermined number of awning-member molded articles are placed such that edge lines thereof are continuous to each other to form a single unit, and the unit is supported by a reinforcing member extending in a direction of the edge line.

8. The awning according to claim 4, wherein vertexes which the first basic element share with the second, third, and fourth basic elements are B, C, and G, respectively, and the other vertex of the first basic element is A, and when a triangular shape ABC having two sides AB and AC as bottom sides is installed substantially horizontally, a point D is determined such that the point D and the point A are symmetrical about a side BC in a horizontal direction, and an angle F in degrees formed by ∠ADG is defined as follows:

$113-S-\theta \leq F \leq 113+T-\theta$, in cases of $\theta \geq 23$, and $F=90\pm10$, in cases of $\theta<23$ wherein $\theta$ is a latitude of a place in which the awning is installed, S is within a range of 5 to 10, and T is within a range of 0 to 5.

9. The awning according to claim 4, wherein when the awning-member molded article is viewed in a first horizontal direction in which areas of opening portions are maximized, the awning-member molded article has a shape of a tetrahedron comprising a larger dihedron formed from two larger triangular portions coupled to each other in a reversed-V shape, and a smaller dihedron which is formed from two smaller triangular portions coupled to each other in a V shape, and further coupled to the larger dihedron such that the smaller dihedron and an upper half part of the larger dihedron are symmetrical with each other, and when the tetrahedron is viewed in a second horizontal direction orthogonal to the first horizontal direction, the tetrahedron has a shape including a lower reversed-triangular portion which has a vertex a positioned on an installation surface and is placed at a lower side, and two upper triangular portions which are placed at an upper side to form a triangular-shaped opening portion between themselves and the lower reversed-triangular portion, a straight line forming a single side of the larger triangular portion, and a straight line forming an edge line of the larger dihedron are caused to form an angle $\alpha$ in degrees, and a straight line which equally divides the larger triangular portion into two parts, and the straight line which forms an edge line of the larger dihedron are caused to form an angle $\beta$ in degrees where $\beta>\alpha$.

10. The awning according to claim 9, wherein $\alpha$ and $\beta$ satisfy the followings:

$\alpha min<\alpha<\alpha min+10$, and $\beta max-10<\beta<\beta max$, wherein the following holds;

$\alpha min=[90-(\text{the latitude}+23)]$, and $\beta max=[90-(\text{the latitude}-23)]$ or $\beta max=[90-(23-\text{the latitude})]$.

11. The awning-member molded article according to claim 2, wherein the awning-member molded article is formed through injection molding, using a first molding die which has a convex portion that conforms to a gap, the first molding die being brought into contact with the basic elements at a peak side, a second molding die which has a corrugated concave-and-convex portion, the second molding die being brought into contact with the basic elements at a concave side of the awning-member molded article, and a slide core adapted to move in a direction of an edge line of the basic elements, and any one of the first and second molding dies is a fixed molding die, and the other one thereof is a movable molding die, and the molding dies are placed opposite to each other, such that the maximum light-interception direction of the awning-member molded article is coincident with an axial direction.

12. An awning comprising a plurality of the awning-member molded articles according to claim 2, such that the awning-member molded articles are installed continuously.

13. An awning comprising a plurality of the awning-member molded articles according to claim 3, such that the awning-member molded articles are installed continuously.

14. An awning comprising a plurality of the awning-member molded articles according to claim 11, such that the awning-member molded articles are installed continuously.

15. The awning according to claim 12, wherein each awning-member molded article has four corner portions provided with through holes, the four corner portions forming a quadrilateral shape when viewed in a plane.

16. The awning according to claim 15, wherein awning-member molded articles adjacent to each other are coupled to each other, through a joint having a protrusion to be fitted in a through hole in one of the awning-member molded articles and a protrusion to be fitted in a through hole in the other awning-member molded article.

17. The awning according to claim 15, wherein a predetermined number of awning-member molded articles are placed such that edge lines thereof are continuous to each other to form a single unit, and the unit is supported by a reinforcing member extending in a direction of the edge line.

18. The awning according to claim 12, wherein
vertexes which the first basic element share with the second, third, and fourth basic elements are B, C, and G, respectively, and the other vertex of the first basic element is A, and when a triangular shape ABC having two sides AB and AC as bottom sides is installed substantially horizontally, a point D is determined such that the point D and the point A are symmetrical about a side BC in a horizontal direction, and an angle F in degrees formed by ∠ADG is defined as follows:
$113-S-\theta \leq F \leq 113+T-\theta$, in cases of $\theta \geq 23$, and
$F=90\pm10$, in cases of $\theta<23$ wherein $\theta$ is a latitude of a place in which the awning is installed, S is within a range of 5 to 10, and T is within a range of 0 to 5.

19. The awning according to claim 12, wherein
when the awning-member molded article is viewed in a first horizontal direction in which areas of opening portions are maximized, the awning-member molded article has a shape of a tetrahedron comprising a larger dihedron formed from two larger triangular portions coupled to each other in a reversed-V shape, and a smaller dihedron which is formed from two smaller triangular portions coupled to each other in a V shape, and further coupled to the larger dihedron such that the smaller dihedron and an upper half part of the larger dihedron are symmetrical with each other, and
when the tetrahedron is viewed in a second horizontal direction orthogonal to the first horizontal direction, the tetrahedron has a shape including a lower reversed-triangular portion which has a vertex a positioned on an installation surface and is placed at a lower side, and two upper triangular portions which are placed at an upper side to form a triangular-shaped opening portion between themselves and the lower reversed-triangular portion,
a straight line forming a single side of the larger triangular portion, and a straight line forming an edge line of the larger dihedron are caused to form an angle $\alpha$ in degrees, and a straight line which equally divides the larger triangular portion into two parts, and the straight line which forms an edge line of the larger dihedron are caused to form an angle $\beta$ in degrees where $\beta>\alpha$.

20. The awning according to claim 19, wherein $\alpha$ and $\beta$ satisfy the followings;
$\alpha\min<\alpha<\alpha\min+10$, and $\beta\max-10<\beta<\beta\max$,
wherein the following holds;
$\alpha\min=[90-(\text{the latitude}+23)]$, and $\beta\max=[90-(\text{the latitude}-23)]$ or $\beta\max=[90-(23-\text{the latitude})]$.

21. An awning-member molded article having a fractal structure formed by injection molding, the awning-member molded article consisting of:
four basic elements that each have a dihedral shape to form triangular sides when viewed in a plane, such that the basic elements are placed adjacent to each other leftwardly and rightwardly, forwardly and rearwardly, and upwardly and downwardly to form a first triangular pyramid,
wherein the four basic elements includes:
(a) a first basic element placed at a reference position to form a side end of the first triangular pyramid,
(b) a second basic element placed to either left or right of the first basic element to form an opposite side end of the first triangular pyramid,
(c) a third basic element placed at either front or rear of the first basic element to form a front or rear end of the first triangular pyramid, and
(d) a fourth basic element placed above the first to third basic elements to form a top end of the first triangular pyramid,
wherein the respective basic elements are placed such that gaps are formed between the basic elements, the gaps being nullified when viewed in a maximum light-interception direction which is inclined by a predetermined angle,
wherein the first basic element, the second basic element, the third basic element, and the fourth basic element are coupled to each other at portions abutted against each other during injection molding,
wherein some of the triangular sides of the four basic elements are aligned to form the outermost surfaces of the first triangular pyramid.

22. An awning-member molded article having a fractal structure formed by injection molding, the awning-member molded article comprising:
four basic elements that each have a dihedral shape to form triangular sides when viewed in a plane, such that the basic elements are placed adjacent to each other leftwardly and rightwardly, forwardly and rearwardly, and upwardly and downwardly to form a first triangular pyramid,
wherein the four basic elements includes:
(a) a first basic element placed at a reference position to form a side end of the first triangular pyramid,
(b) a second basic element placed to either left or right of the first basic element to form an opposite side end of the first triangular pyramid,
(c) a third basic element placed at either front or rear of the first basic element to form a front or rear end of the first triangular pyramid, and
(d) a fourth basic element placed above the first to third basic elements to form a top end of the first triangular pyramid,
wherein the respective basic elements are placed such that gaps are formed between the basic elements, the gaps being nullified when viewed in a maximum light-interception direction which is inclined by a predetermined angle,
wherein the first basic element, the second basic element, the third basic element, and the fourth basic element are coupled to each other at portions abutted against each other during injection molding,
wherein some of the triangular sides of the four basic elements are aligned to form the outermost surfaces of the first triangular pyramid,
wherein each basic element includes four dihedrons having a triangular shape when viewed in a plane, such that the dihedrons are placed adjacent to each other leftwardly and rightwardly, forwardly and rearwardly, and upwardly and downwardly to form a second triangular pyramid,
wherein each basic element includes:
(i) a first dihedron placed at a reference position to form a side end of the second triangular pyramid, (ii) a second dihedron placed to either right or left of the first dihedron to form an opposite side end of the second triangular pyramid, (iii) a third dihedron placed at either front or rear of the first dihedron to form a front or rear end of the second triangular pyramid, and (iv) a fourth dihedron placed above the first to third dihedrons to form a top end of the second triangular pyramid, and wherein the respective dihedrons are coupled to each other at portions abutted against each other during injection molding, and wherein the second triangular pyramid composing the basic element is smaller than and embedded within the first triangular pyramid.

23. An awning-member molded article having a fractal structure formed by injection molding, the awning-member molded article consisting of:

four dihedrons to form a quadrilateral shape when viewed in a plane, such that the four dihedrons are placed adjacent to each other leftwardly and rightwardly, forwardly and rearwardly, and upwardly and downwardly, wherein each dihedron is constituted by two triangular-shaped plate portions, the four dihedrons including a first dihedron, a second dihedron, a third dihedron, and a fourth dihedron, and triangular plate portions forming front surfaces of the first, second, and fourth dihedrons are in the same plane constituting a front surface of the awning-member molded article and, with respect to the front surface of the awning-member molded article, a triangular plate portion forming a side surface of the second dihedron is bent toward a bottom surface, so that a triangular hole with a triangular shape is formed in the front surface of the awing-member molded article, and triangular plate portions forming side surfaces of the first, third, and fourth dihedrons are in the same plane constituting a side surface of the awning-member molded article and, with respect to the side surface of the awning-member molded article, a triangular plate portion forming the front surface of the third dihedron is bent toward the bottom surface, so that a triangular hole with a triangular shape is formed in the side surface of the awing-member molded article, thus, the awing-member molded article has a dihedral shape constituted by a dihedron main-body portion formed from two middle triangular plate portions having the triangular holes at their center portions which are coupled to each other with an edge line interposed therebetween, and the triangular plate portions which are bent toward the bottom surface with respect to the middle-triangular plate portions.

24. An awning-member molded article having a fractal structure formed by injection molding, the awning-member molded article comprising:

four basic elements having a dihedral shape to form a quadrilateral shape when viewed in a plane, such that the four basic elements are placed adjacent to each other leftwardly and rightwardly, forwardly and rearwardly, and upwardly and downwardly, each basic element comprising four dihedrons to form a quadrilateral shape when viewed in a plane, such that the four dihedrons are placed adjacent to each other leftwardly and rightwardly, forwardly and rearwardly, and upwardly and downwardly, the four dihedrons including a first dihedron, a second dihedron, a third dihedron, and a fourth dihedron, wherein triangular plate portions forming front surfaces of the first, second, and fourth dihedrons are in the same plane constituting a front surface of a corresponding basic element and, with respect to the front surface of the corresponding basic element, a triangular plate portion forming a side surface of the second dihedron is bent toward a bottom surface, so that a triangular hole with a triangular shape is formed in the front surface of the basic element, and triangular plate portions forming side surfaces of the first, third, and fourth dihedrons are in the same plane constituting the side surface of the corresponding basic element and, with respect to the side surface of the corresponding basic element, a triangular plate portion forming the front surface of the third dihedron is bent toward the bottom surface, so that a triangular hole with a triangular shape is formed in the side surface of the basic element, thus, each basic element has a dihedral shape constituted by a dihedron main-body portion formed from two middle-triangular plate portions having the triangular holes at their center portions which are coupled to each other with an edge line interposed therebetween, and the triangular plate portions which are bent toward the bottom surface with respect to the middle-triangular plate portions.

* * * * *